United States Patent
Nakamoto et al.

(10) Patent No.: US 7,379,233 B2
(45) Date of Patent: May 27, 2008

(54) RAMAN AMPLIFIER UTILIZING PUMP MODULATION FOR EXPANDING GAIN BAND WIDTH

(75) Inventors: Hiroshi Nakamoto, Kawasaki (JP); Takao Naito, Kawasaki (JP); Kenichi Torii, Kawasaki (JP); Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 10/715,141

(22) Filed: Nov. 18, 2003

(65) Prior Publication Data

US 2005/0063043 A1  Mar. 24, 2005

(30) Foreign Application Priority Data

Nov. 18, 2002  (JP) .............................. 2002-334037

(51) Int. Cl.
*H04B 10/17* (2006.01)
(52) U.S. Cl. ..................... 359/334; 359/341.3
(58) Field of Classification Search ................ 359/334, 359/341.2, 344, 341.1, 341.33; 398/75
See application file for complete search history.

(56) References Cited

U.S. PATENT DOCUMENTS

| | | | |
|---|---|---|---|
| 5,570,218 A | 10/1996 | Sotom et al. | |
| 5,991,071 A * | 11/1999 | Naito | 359/341.31 |
| 6,373,621 B1 * | 4/2002 | Large et al. | 359/334 |
| 6,452,716 B1 * | 9/2002 | Park et al. | 359/334 |
| 6,456,426 B1 * | 9/2002 | Bolshtyansky et al. | 359/334 |
| 6,587,260 B2 * | 7/2003 | Kikuchi et al. | 359/334 |
| 6,611,368 B1 * | 8/2003 | Grant et al. | 359/334 |
| 6,639,715 B2 * | 10/2003 | Naito et al. | 359/334 |
| 6,704,135 B2 * | 3/2004 | Sasaoka et al. | 359/334 |
| 6,813,067 B1 * | 11/2004 | Birk et al. | 359/334 |
| 6,844,961 B2 * | 1/2005 | Odate et al. | 359/334 |
| 6,930,823 B2 * | 8/2005 | Nakamoto et al. | 359/334 |
| 7,116,470 B2 * | 10/2006 | Martinelli et al. | 359/334 |

(Continued)

FOREIGN PATENT DOCUMENTS

EP  1 148 666 A2  10/2001

(Continued)

OTHER PUBLICATIONS

Naito, T.; Tanaka, T.; Torii, K.; Shimojoh, N.; Nakamoto, H.; Suyama, M.; A broadband distributed Raman amplifier for bandwidths beyond 100 nm; Optical Fiber Communication Conference and Exhibit, 2002. OFC 2002; Mar. 17-22, 2002 pp. 116-117.*

(Continued)

*Primary Examiner*—Deandra Hughes
*Assistant Examiner*—Ari M Diacou
(74) *Attorney, Agent, or Firm*—Staas & Halsey LLP

(57) ABSTRACT

A plurality of pump light sources generate plural variations of pump light having different frequencies. A modulation circuit intensity-modulates the plural variations of pump light in the predetermined periods, respectively. A pump light pair whose frequency difference equals a Raman shift frequency are modulated such that they cannot simultaneously enters an emission state. A wavelength-multiplexer wavelength-multiplexes the plural variations of pump light modulated by the modulation circuit. A optical guide device guides the plural variations of pump light wavelength-multiplexed by the wavelength-multiplexer to an optical fiber.

24 Claims, 24 Drawing Sheets

U.S. PATENT DOCUMENTS

| | | | |
|---|---|---|---|
| 7,133,192 B2* | 11/2006 | Tanaka et al. | 359/334 |
| 7,149,256 B2* | 12/2006 | Vrazel et al. | 375/295 |
| 7,158,286 B2* | 1/2007 | Havard et al. | 359/334 |
| 7,212,333 B2* | 5/2007 | Sugaya | 359/334 |
| 7,239,441 B2* | 7/2007 | Yoshida | 359/337.12 |
| 2002/0097481 A1* | 7/2002 | Du et al. | 359/334 |
| 2002/0145796 A1* | 10/2002 | Kikuchi et al. | 359/341.33 |
| 2003/0072050 A1* | 4/2003 | Vrazel et al. | 359/110 |
| 2003/0081307 A1* | 5/2003 | Fludger et al. | 359/334 |
| 2004/0004754 A1* | 1/2004 | Mailhot et al. | 359/334 |
| 2004/0190120 A1* | 9/2004 | Torii et al. | 359/334 |
| 2005/0100343 A1* | 5/2005 | Yoshida | 398/177 |
| 2005/0110980 A1* | 5/2005 | Maehara et al. | 356/73.1 |
| 2006/0050365 A1* | 3/2006 | Hainberger et al. | 359/334 |

FOREIGN PATENT DOCUMENTS

| | | |
|---|---|---|
| EP | 1148666 | 10/2001 |
| JP | 11-307854 | 11/1999 |
| JP | 2002-6349 | 1/2002 |
| JP | 2002-229084 | 8/2002 |
| JP | 2002-303895 | 10/2002 |
| WO | WO 02/086554 | 10/2002 |

OTHER PUBLICATIONS

Y. Emori, K. Tanaka and S. Namiki; 100nm bandwidth flat-gain Raman amplifiers pumped and gain-equalised by 12-wavelength-channel WDM laser diode unit; Elec. Lett. Aug. 5, 1999 vol. 35 No. 16.*

Govind P. Agrawal, Nonlinear Fiber Optics, Second Edition, 1995, pp. 316-319, 363.

C.R.S. Fludger et al., "Novel Ultra-Broadband High Performance Distributed Raman Amplifier Employing Pump Modulation", Optical Fiber Communication Conference (OFC 2002), Mar. 20, 2002, pp. 183-184.

Naito et al.; "A Broadband Distributed Raman Amplifiers for Bandwidths Beyond 100 nm"; Optical Fiber Communication Conference; Technical Digest, Post Conference Digest; Mar. 17-22, 2002; Trends in Optics and Photonics Series (TOPS), vol. 70, pp. 116-117.

Partial European Search Report for European Patent Application No. 03026524.3-1246; dated Jun. 29, 2005.

Naito et al., "A Broadband Distributed Raman Amplifier for Bandwidths Beyond 100 nm," Optical Fiber Communication Conference and Exhibit (OFC), Technical Digest Postconference Digest, Anaheim, CA, Mar. 17-22, 2002.

Fludger et al., "Novel Ultra-Broadband High Performance Distributed Raman Amplifier Employing Pump Modulation," Optical Fiber Communication Conference and Exhibit (OFC), Technical Digest, Postconference Digest, Anaheim, CA, Mar. 17-22.

European Search Report for European Application No. EP 03026524.3-2415 dated Jan. 23, 2006.

Japanese Patent Office Notice of Rejection Grounds, mailed Mar. 20, 2007 and issued in corresponding Japanese Patent Application No. 2002-334037.

* cited by examiner

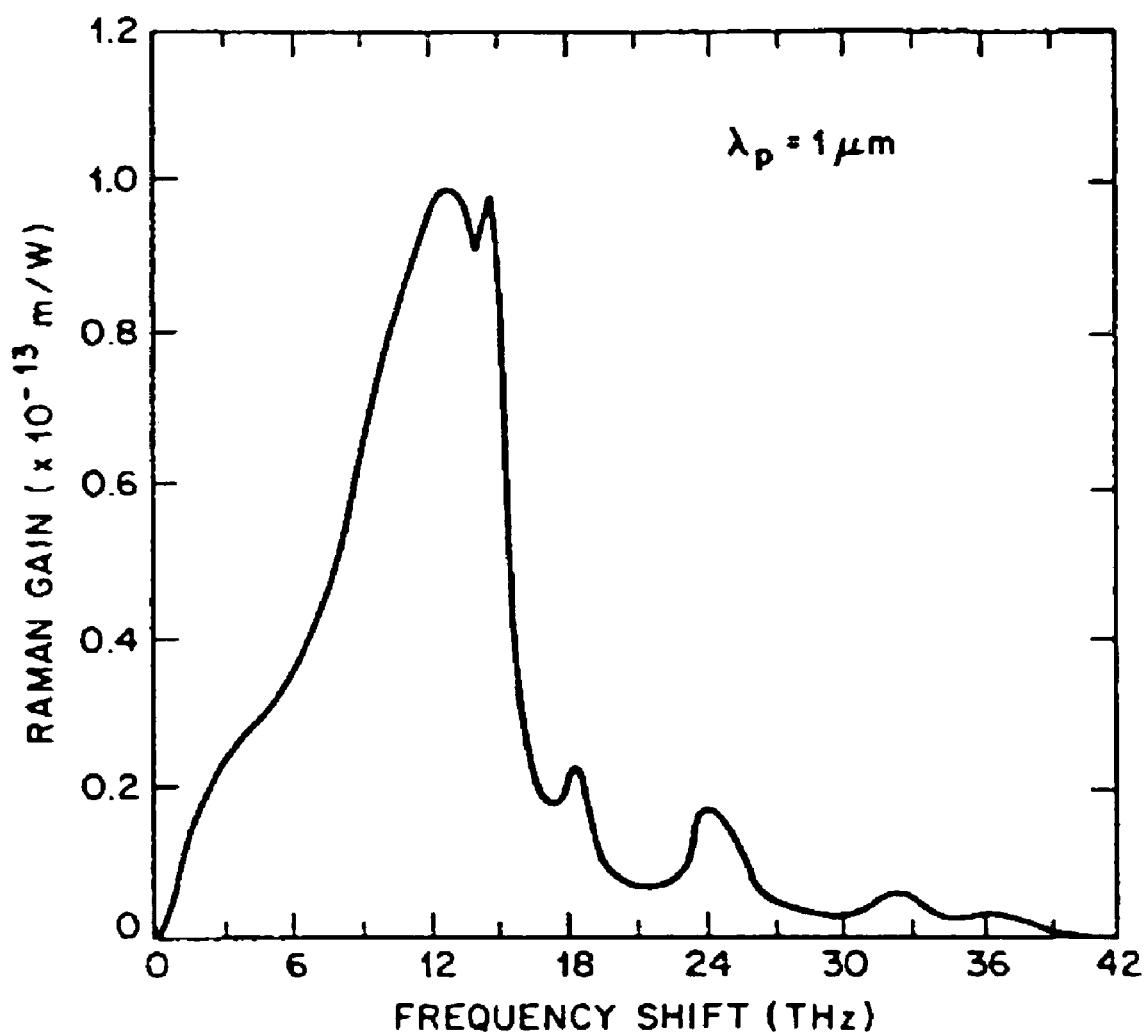
F I G. 2

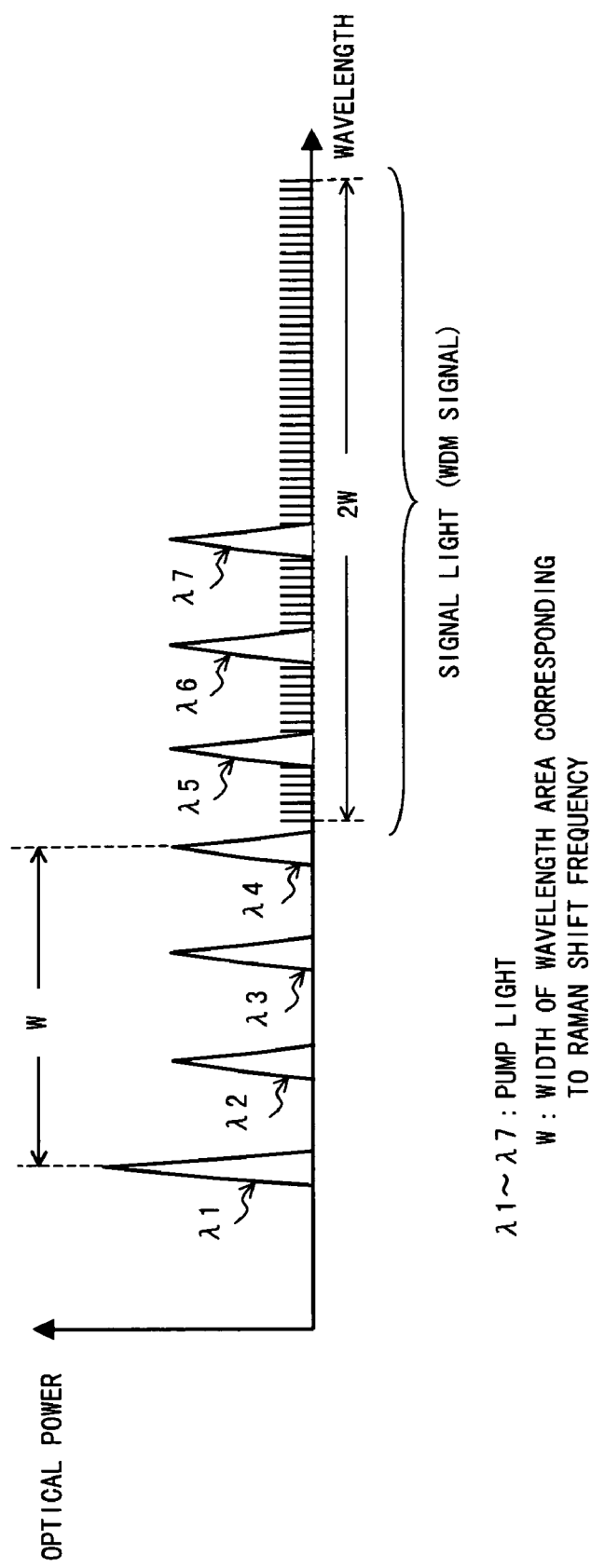
F I G. 7

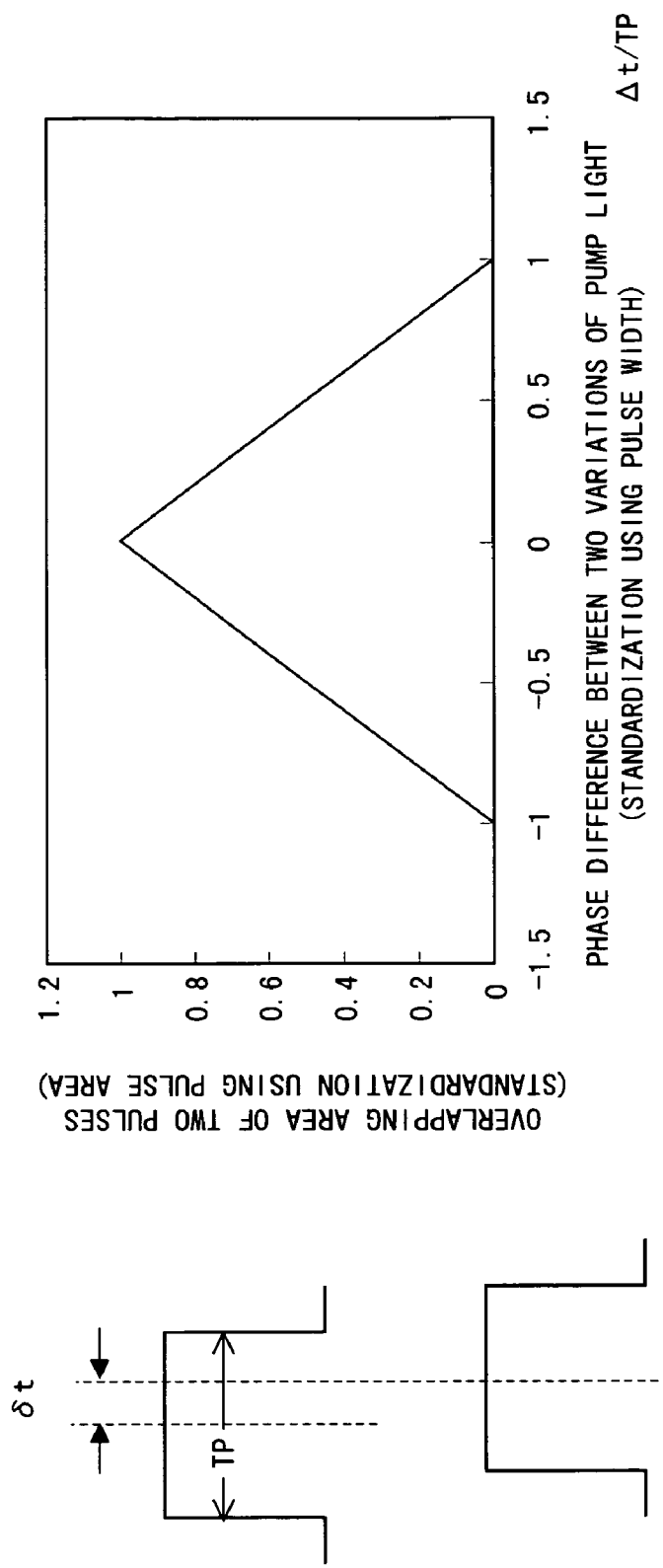
F I G. 11

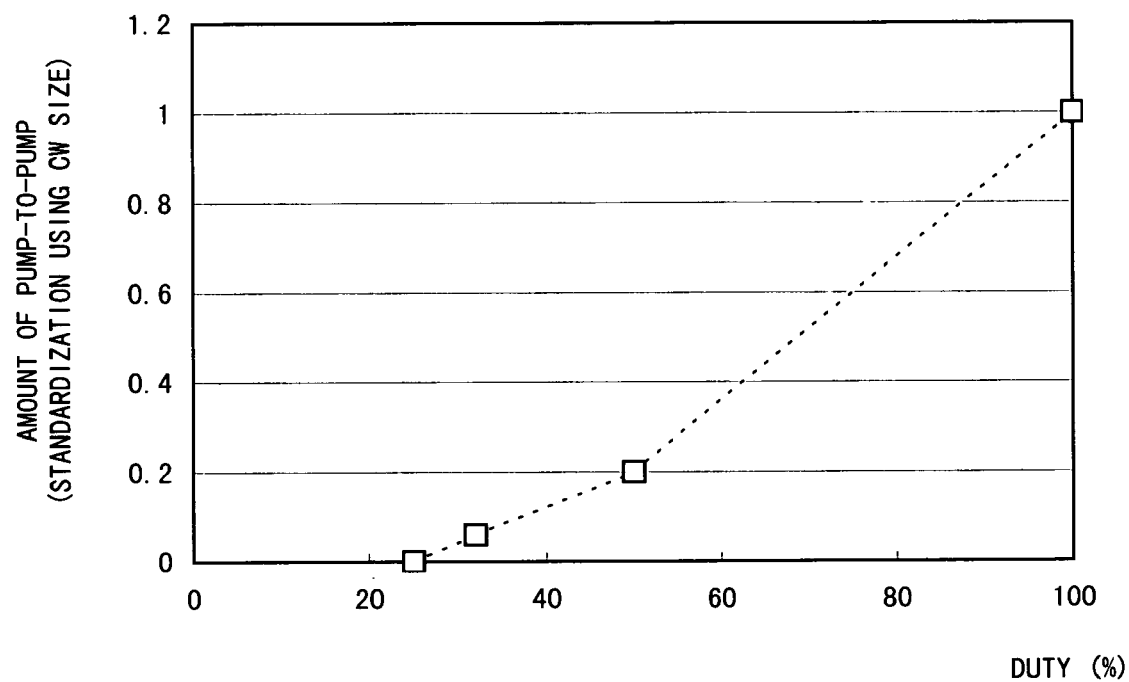
F I G. 1 4

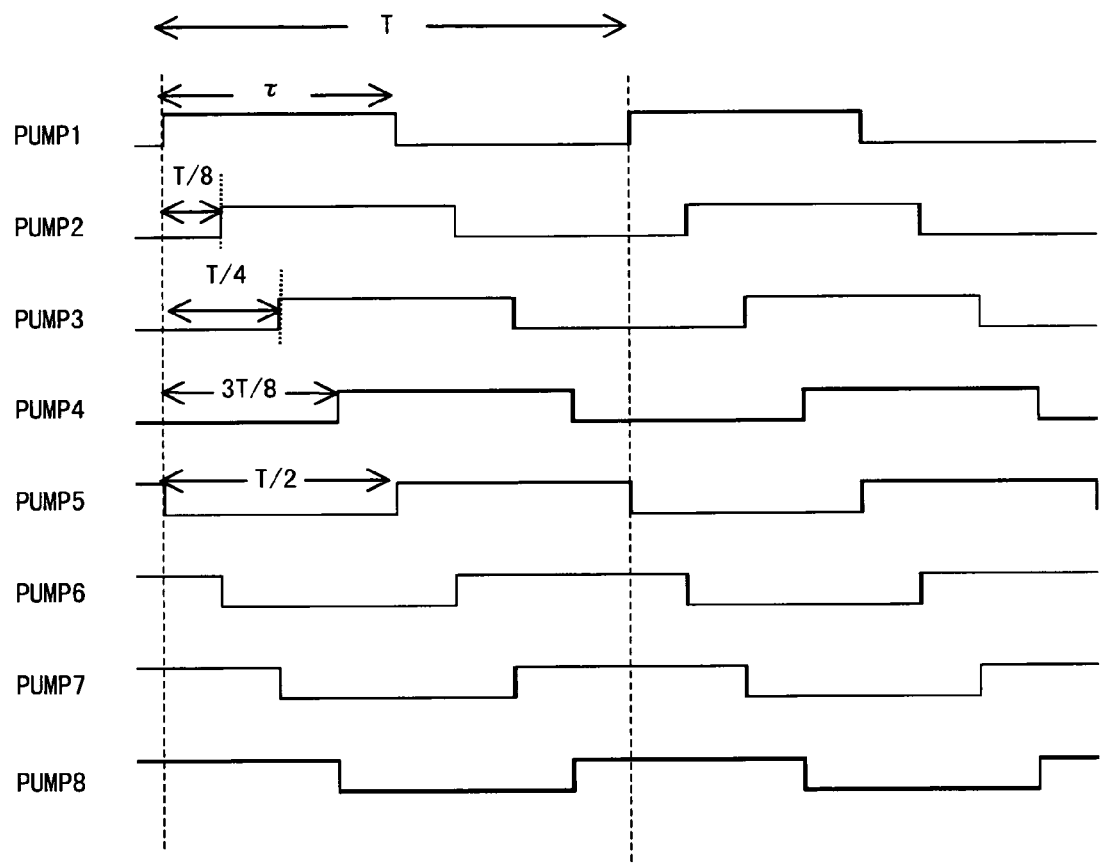
F I G. 1 7

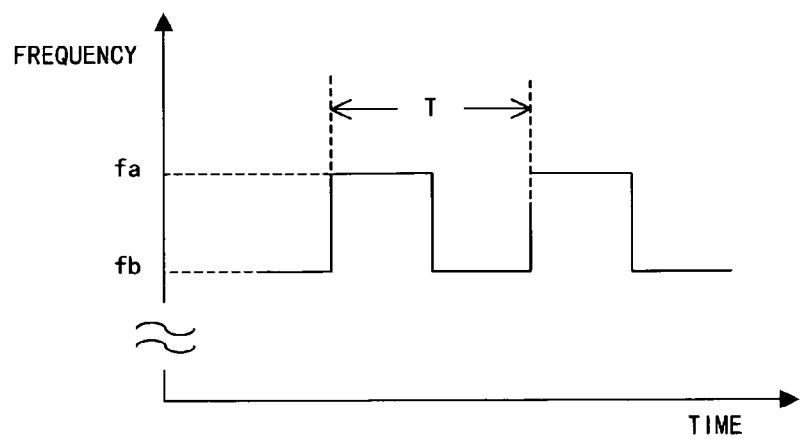
F I G. 22A
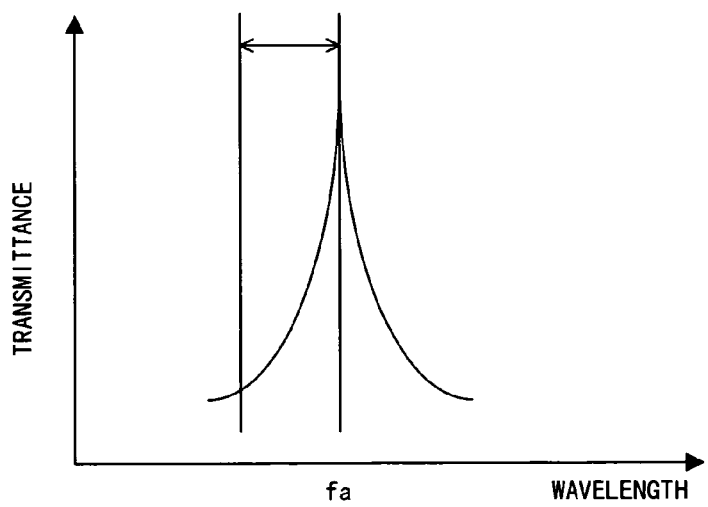
F I G. 22B

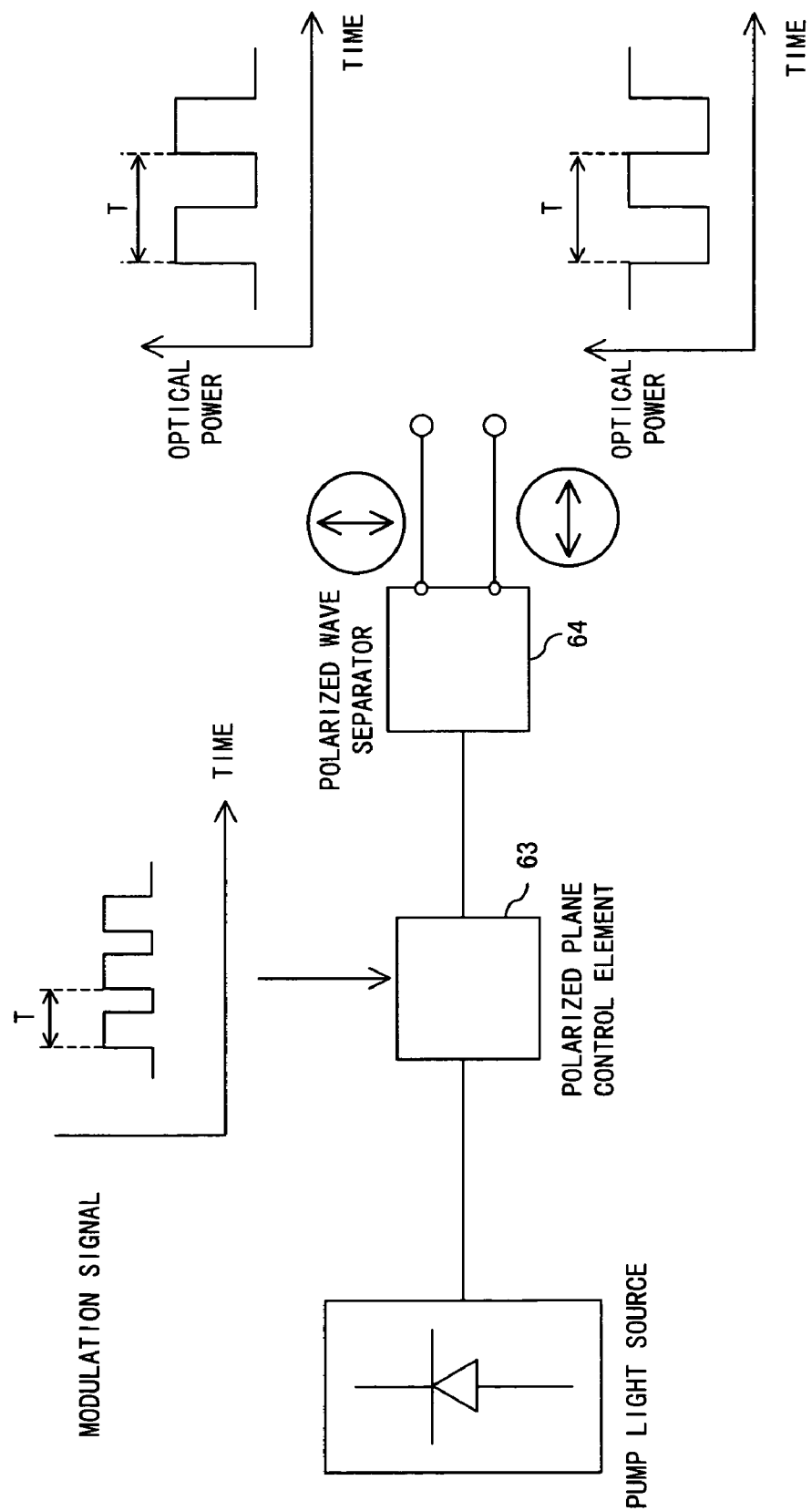
F I G. 2 4

RAMAN AMPLIFIER UTILIZING PUMP MODULATION FOR EXPANDING GAIN BAND WIDTH

BACKGROUND OF THE INVENTION

1. Field of the Invention

The present invention relates to a Raman amplifier having a large gain bandwidth, and more specifically to a Raman amplifier having a gain bandwidth larger than a bandwidth corresponding to a Raman shift frequency.

2. Description of the Related Art

In a large optical communications system, a repeater including an optical amplifier for amplifying an optical signal is normally provided in a transmission line. In a large-capacity optical communications system, a WDM (wavelength division multiplexing) transmission is often used, and a Raman amplifier receives much attention as an optical amplifier for amplifying WDM light.

FIG. 1 shows a basic configuration of an example of a Raman amplifier (for example, SubOptic '2001 PD5, H. Nakamoto et al. "1.05 Tbit/s WDM Transmission over 8186 Km Using Distributed Raman Amplifier Repeaters"). In Raman amplification, a transmission medium (optical fiber) for transmission of a signal is used as an amplification medium. The Raman amplifier includes a pump light source 1 for generating pump light, and a WDM coupler 2 for guiding the pump light to optical fibers 3 and 4 for use as amplification media. The pump light source 1 is, for example, a laser light source. Also in the Raman amplification, normally, the smaller the core diameter of an optical fiber used as an amplification medium, the larger the Raman gain. Therefore, in the Raman amplifier shown in FIG. 1, a optical fiber (−D) 3 having a small core diameter and negative dispersion is provided.

In the Raman amplifier with the above-mentioned configuration, the signal (WDM light) transmitted through the optical fiber (+D) 4 passes through the optical fiber (−D) 3. At this time, pump light is supplied to the optical fiber (−D) 3. That is, the optical fiber (−D) 3 functions as an amplification medium. Therefore, the signal light is amplified in the optical fiber (−D) 3. The Raman amplifier is less noisy and obtains larger gain band than the most popular optical amplifier in the current market, that is, an erbium doped fiber amplifier (EDFA).

FIG. 2 shows the gain characteristic of the Raman amplification. This example shows the gain characteristic obtained when the pump light having a wavelength of 1 μm is supplied to a quartz optical fiber.

In the Raman amplification, when pump light is supplied to an optical fiber, the optical fiber functions as an amplification medium which amplifies the light of the frequency shifted from the frequency of the pump light by a predetermined frequency.

"Practically, as shown in FIG. 2, the Raman gain in the optical fiber grows substantially linearly with an increasing amount of frequency shift from the pump light frequency, and indicates the peak at the frequency about 13.2 THz lower than the pump light frequency (in the case of quartz fiber)." When the amount of frequency shift from the pump light frequency exceeds 13.2 THz, the Raman gain suddenly decreases. Hereinafter, the difference between the frequency of the given pump light and the frequency indicating the peak of the Raman gain obtained from the pump light is referred to as a Raman shift frequency. That is, the Raman shift frequency is approximately 13.2 THz.

FIG. 3 shows the amplifying operation of the Raman amplifier. In FIG. 3, it is assumed that the backward-pumping system in which pump light is propagated in the opposite direction of the propagation of signal light.

In FIG. 3, the transmission station or the repeater at the preceding stage outputs signal light of predetermined optical power (−8.2 dBm/ch in this example). In this case, the optical power of the signal light gradually attenuates as the propagation distance becomes longer. If there is no Raman gain, the optical power of the signal light which has reached a repeater 5 attenuates down to −18.5 dBm/ch. Therefore, if there is no Raman amplifier, it is necessary to obtain the gain of about 10 dB using an erbium doped fiber amplifier, etc. to set the output power of the repeater 5 at −8.2 dBm/ch. When only an erbium doped fiber amplifier is used, the optical signal power level in the transmission line drops to −18.5 dBm/ch. On the other hand, when the Raman amplifier is used in addition to the erbium doped fiber amplifier, it drops only to −13.7 dBm/ch. Thus, the noise characteristic can be improved by using the Raman amplifier.

FIG. 4 shows an example of the arrangement of wavelengths using the Raman amplifier. In this example, the Raman amplification is performed using plural variations of pump light having different frequencies. That is, the Raman amplifier uses plural variations of pump light having different wavelengths $\lambda 1 \sim \lambda 4$. In the Raman amplification, as described above by referring to FIG. 2, the peak of gain appears in the frequency area of about 13.2 THz shifted from the pump light frequency. In the 1,550 nm band, 13.2 THz can be converted into wavelength, which corresponds to approximately 100 nm. Therefore, in the Raman amplifier, the peak gain appears in the frequency area about 100 nm shifted from each pump light wavelength. When the gains by the plural variations of pump light $\lambda 1 \sim \lambda 4$ are compounded, a large gain band (about 100 nm in this example) can be obtained.

However, in the Raman amplification, as described above by referring to FIG. 2, a certain gain can be obtained in an area smaller than 13.2 THz in frequency shift from the pump light frequency. That is, in the Raman amplification, a gain can be obtained in an area smaller than 100 nm in wavelength shift from the pump light wavelength. Therefore, there can be a phenomenon in which pump light having a short wavelength amplifies pump light having a long wavelength. Hereinafter, the phenomenon can be referred to as pump-to-pump.

When a pump-to-pump phenomenon occurs, the optical power of pump light having a long wavelength (pump light to be pumped) becomes large, but the optical power of pump light having a short wavelength (pump light for pumping) decreases correspondingly. As a result, the noise characteristic improving effect by the Raman amplification of the signal light having a short wavelength (mainly the signal light amplified by the pump light having a short wavelength) is reduced as described below.

FIGS. 5A and 5B are explanatory views of the influence by a pump-to-pump phenomenon. FIG. 5A shows the state of the signal light power in which no pump-to-pump phenomenon occurs. The Raman amplifying operation in this case is described above by referring to FIG. 3. FIG. 5B shows the state of the signal light power in which a pump-to-pump phenomenon has occurred. If a pump-to-pump phenomenon has occurred, a part of the energy of the pump light having a short wavelength is used to amplify the pump light having a long wavelength. Thus, in the Raman amplifier in which a pump-to-pump phenomenon has occurred, it is necessary to increase the optical power of the pump light so that the signal light can be amplified as in the case in which no pump-to-pump phenomenon has occurred. Therefore, the noise from the ASE (amplified spontaneous emission) increases, thereby reducing the noise characteristic. When a pump-to-pump phenomenon occurs, the optical power level is quickly enhanced around the fiber length of 50 km. Therefore, the lower limit of the optical power level in the fiber drops, thereby reducing the above-mentioned noise characteristic improving effect.

If the optical power of each pump light is changed by the pump-to-pump phenomenon, the gain in the wavelength area for transmission of signal light does not become flat, and there is the problem that it is difficult to maintain uniform optical power of each signal light. Furthermore, since a part of the energy of the pump light having a short wavelength is absorbed by the pump light having a long wavelength, it is also necessary to keep sufficient optical power of the pump light having a short wavelength. Therefore, since it is necessary to wavelength-multiplex plural variations of pump light, the resultant configuration becomes exceedingly complicated.

In this situation, there is a method of suppressing a pump-to-pump phenomenon by appropriately modulating each pump light to solve the above-mentioned problem (for example, the Non-patent application document 1).

FIG. 6 shows a well-known pump light modulation method described in the non-patent application document 1. In FIG. 6, the horizontal axis indicates time while the vertical axis indicates an optical power level. In the Raman amplifier, pump light having a short wavelength (pump light 1 (1,423 nm) and pump light 2 (1,444 nm)), and pump light having a long wavelength (pump light 3 (1,464 nm) and pump light 4 (1,495 nm)) are used. Each pump light is modulated by the duty of 50 percents.

The pump light having a short wavelength and the pump light having a long wavelength are modulated to have opposite phases. That is, when the pump light having a short wavelength is in the emission state, the pump light having a long wavelength is in the extinct state. When the pump light having a short wavelength is in the extinct state, the pump light having a long wavelength is in the emission state. Therefore, if the wavelength dispersion in an optical transmission line is ignored, no pump-to-pump phenomenon occurs between the pump light having a short wavelength and the pump light having a long wavelength. On the other hand, the phases of the pump light belonging to the same group are the same. That is, the phases of the pump light 1 and 2 are the same, and the phases of the pump light 3 and 4 are the same. Therefore, there can be a pump-to-pump phenomenon occurring in the pump light belonging to the same group. However, the wavelength difference between the pump light belonging to the same group is approximately 20~30 nm, and the transfer of energy in the pump light is small. Therefore, when the pump light modulation as shown in FIG. 6 is performed, a pump-to-pump phenomenon can be suppressed on the whole.

Non-patent Application Document:
OFC 2002, WB4 C. R. S. Fludger et al., "Novel Ultra-broadband High Performance Distributed Raman Amplifier Employing Pump Modulation" (FIG. 1)

Recently, a larger-capacity WDM signal is demanded, and an optical transmission system having a wavelength area larger than 100 nm for arrangement of signal light has been developed. In this system, as shown in FIG. 7, it is necessary to appropriately arrange plural variations of pump light over a wavelength area larger than the wavelength area corresponding to the Raman shift frequency.

However, the non-patent application document 1 is described based on the presumption that the wavelength area for arrangement of signal light is smaller than the wavelength area corresponding to the Raman shift frequency. Therefore, if the method of the non-patent application document 1 is applied to the Raman amplifier having a wavelength area for arrangement of signal light larger than the wavelength area corresponding to the Raman shift frequency, then the pump-to-pump phenomenon cannot be appropriately suppressed, and it is considered that a desired noise characteristic cannot be obtained. That is, when a wavelength area for arrangement of signal light is larger than the wavelength area corresponding to the Raman shift frequency, the well-known technology cannot sufficiently suppress the noise from the pump-to-pump phenomenon.

SUMMARY OF THE INVENTION

The present invention aims at improving the noise characteristic of a Raman amplifier having a gain bandwidth larger than the bandwidth corresponding to the Raman shift frequency.

The Raman amplifier according to the present invention is a Raman amplifier having a gain bandwidth larger than a bandwidth corresponding to a Raman shift frequency, and includes: a transmission medium for propagating a WDM signal; a pump light source for generating plural variations of pump light having different frequencies; a modulation unit for modulating the plural variations of pump light into optical signals having a first optical level and a second optical level lower than the first optical level; and an optical guide unit for guiding the plural pump light modulated by the modulation unit to the transmission medium. The modulation unit modulates the plural variations of pump light such that the pump light having the frequency difference practically equal to the Raman shift frequency cannot simultaneously indicate the first optical level.

To make the gain bandwidth of the Raman amplifier larger than the bandwidth corresponding to the Raman shift frequency, it is necessary-to-arrange plural variations of pump light over an area larger than the bandwidth corresponding to the Raman shift frequency. Therefore, in the Raman amplifier having a gain bandwidth larger than the bandwidth corresponding to the Raman Shift frequency, there is necessarily a set of pump light having the frequency difference practically equal to the Raman shift frequency. On the other hand, the transfer of energy between the pump light indicates the peak when the frequency difference practically equals the Raman shift frequency. Furthermore, the higher the optical level of the pump light, the larger the transfer of energy between the pump light. Therefore, the transfer of energy between pump light can be reduced if the pump light having the frequency difference practically equal to the Raman shift frequency cannot simultaneously indicate high optical levels (that is, the above-mentioned first optical level).

In the above-mentioned Raman amplifier, if the transmission medium includes the first and second transmission media, the modulation unit may be configured to include an optical switch which guides the plural variations of pump light alternately to the first transmission medium or the second transmission medium. With this configuration, the pump light generated by the pump light source can be efficiently used. Plural variations of WDM light can be concurrently amplified.

BRIEF DESCRIPTION OF THE DRAWINGS

FIG. 2 shows a gain characteristic of a Raman amplifier;

FIG. 7 is an explanatory view of the arrangement of the pump light when a wavelength area larger than a wavelength area corresponding to a Raman shift frequency is amplified;

FIG. 11 is an explanatory view showing the relationship between the phase difference of pump light and the time in which emission states overlap;

FIG. 14 shows the relationship between the duty of a modulation signal and the amount of pump-to-pump;

FIG. 17 shows an example of another modulation method;

FIG. 22A shows the output of a pump light source;

FIG. 22B shows the characteristic of a filter;

FIG. 24 shows another embodiment of a method of modulating pump light.

DESCRIPTION OF THE PREFERRED EMBODIMENTS

The embodiments of the present invention are described below by referring to the attached drawings.

Figure 1:
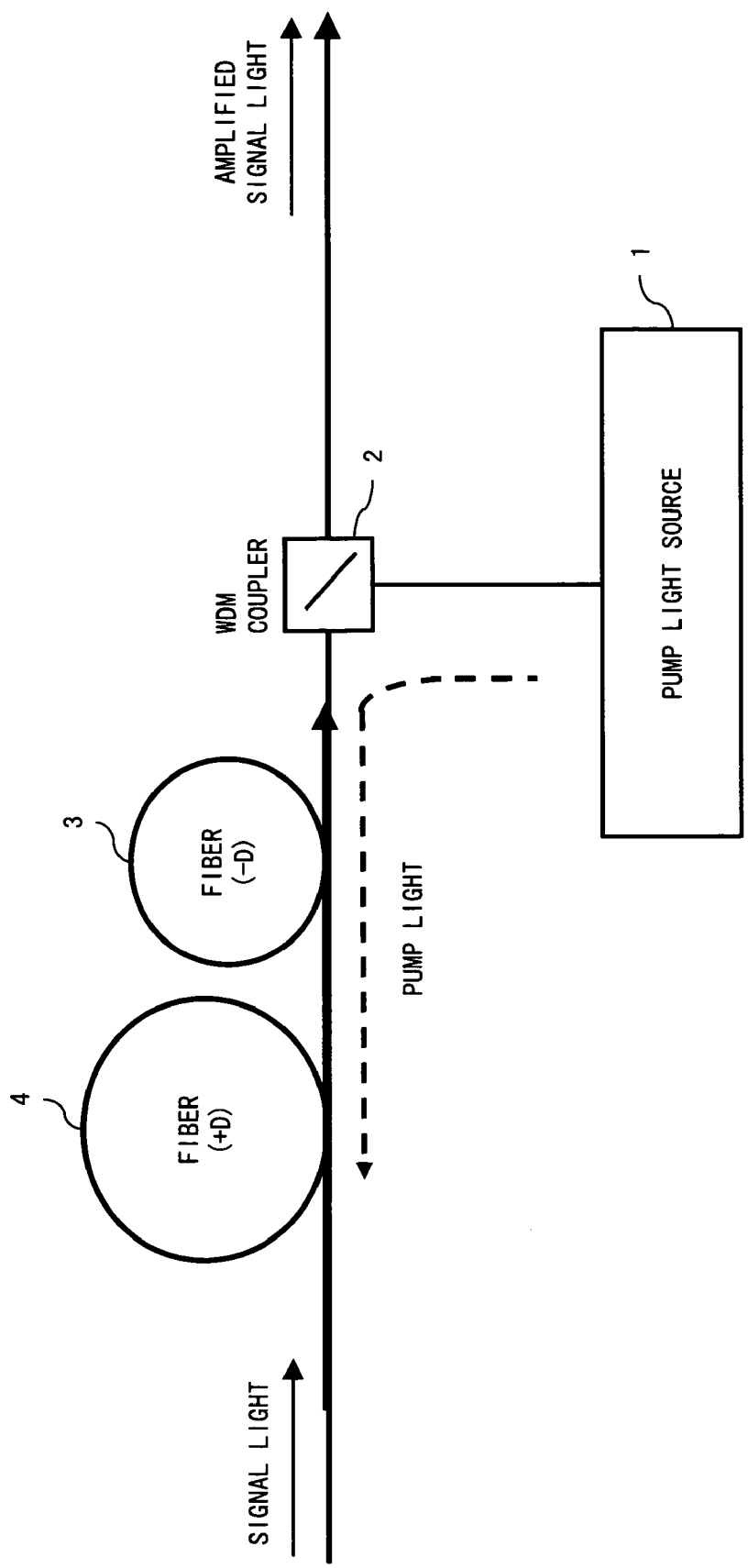
FIG. 1 shows a basic configuration of an example of a Raman amplifier.
Figure 3:
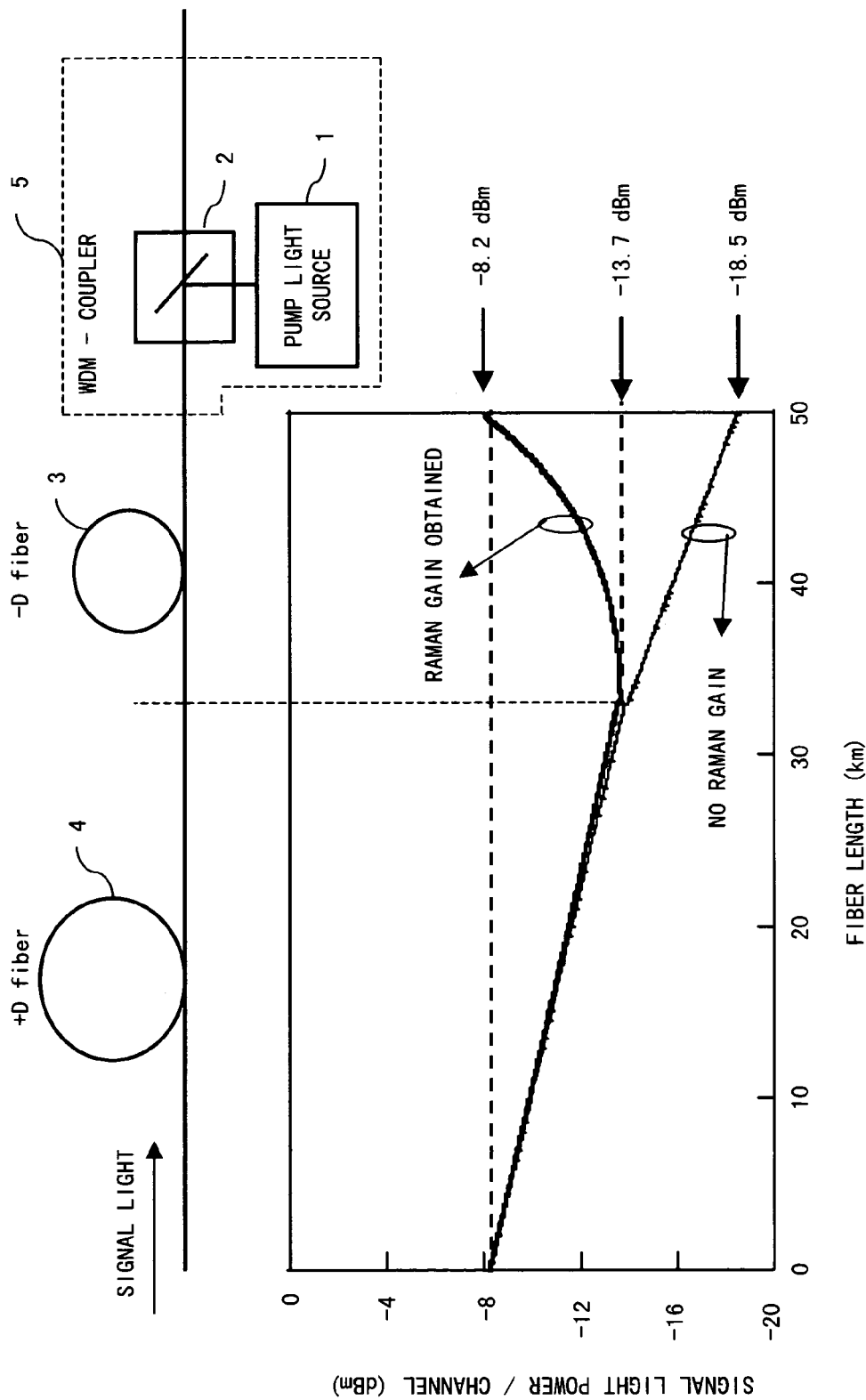
FIG. 3 is an explanatory view of an amplifying operation by a Raman amplifier.
Figure 4:
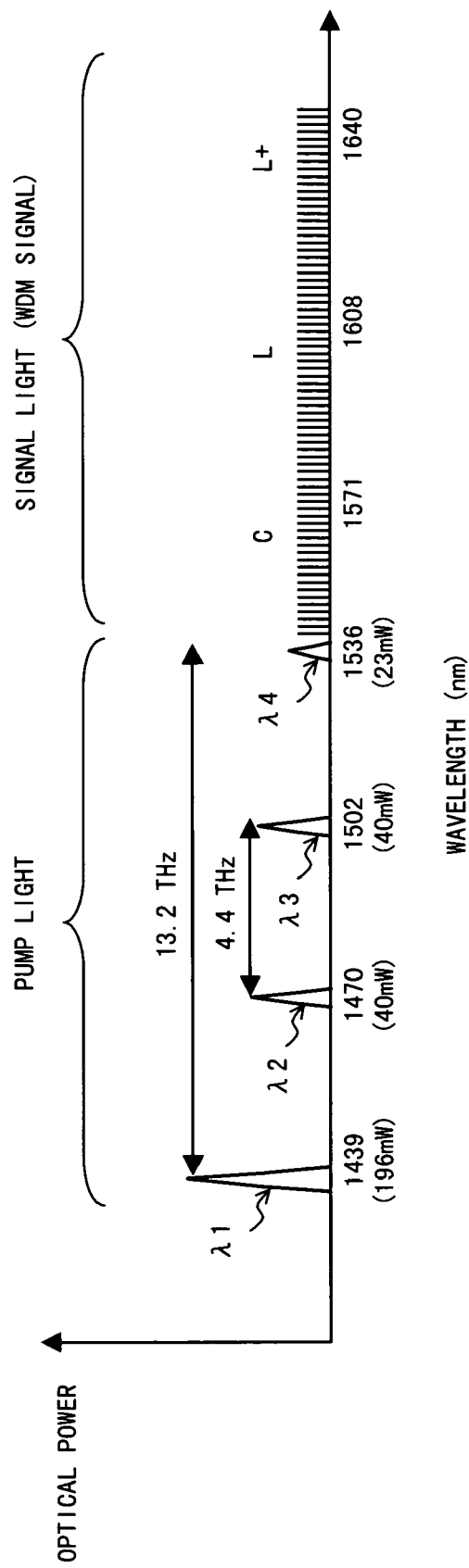
FIG. 4 shows an example of the wavelength arrangement for a Raman amplifier.
Figure 5A:
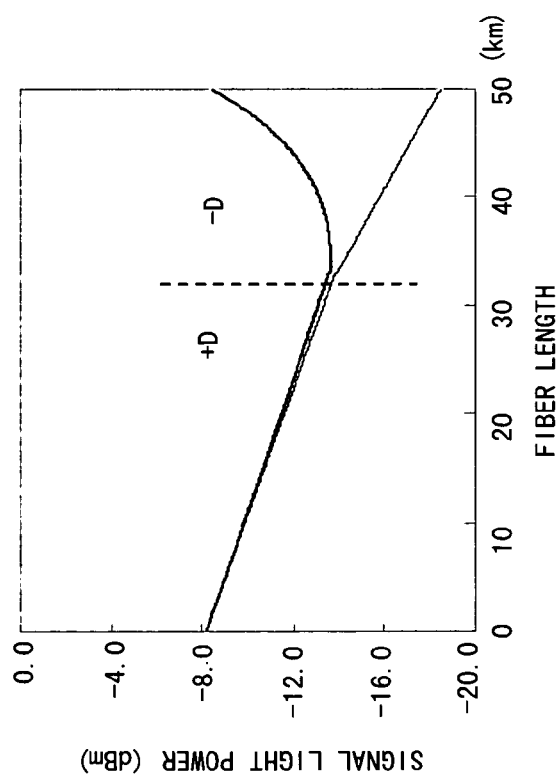
FIGS. 5A and 5B are explanatory views of the influence of a pump-to-pump phenomenon.
Figure 5B:
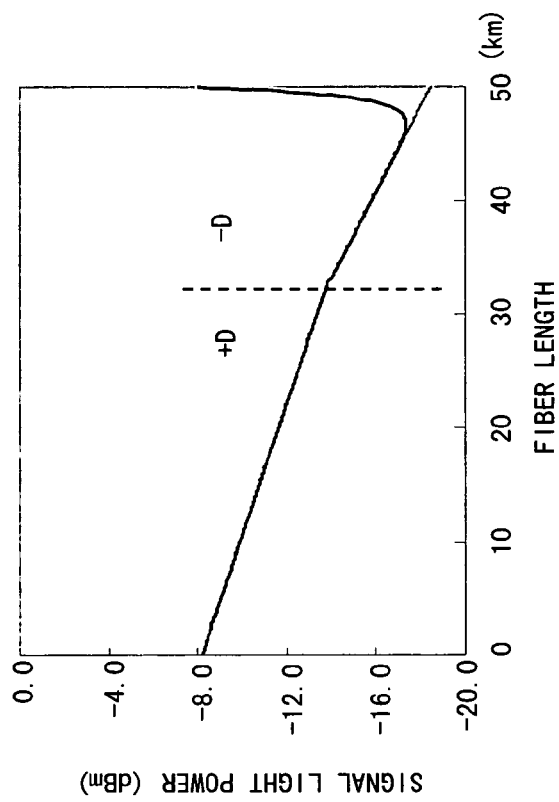
Figure 6:
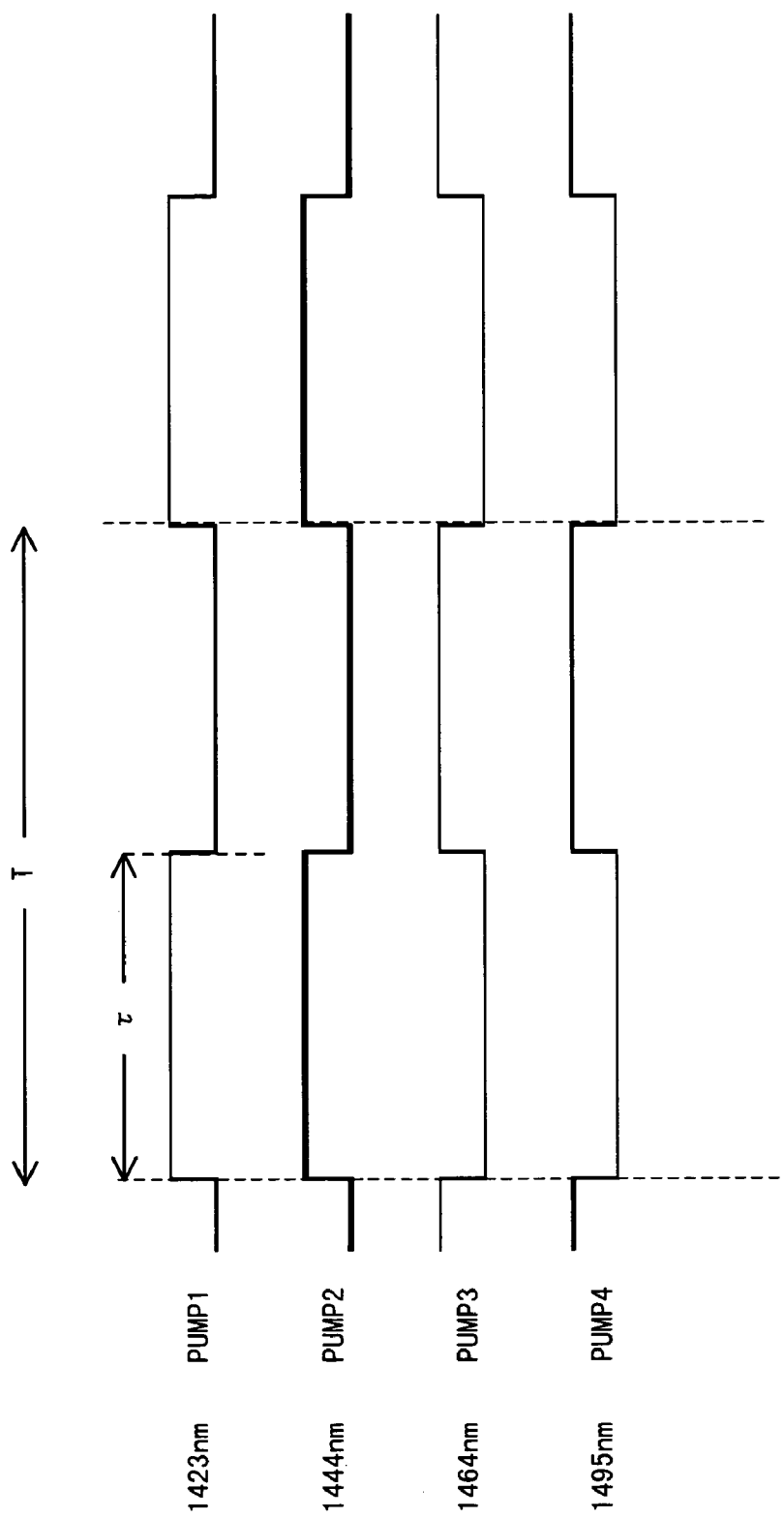
FIG. 6 shows a well-known pump light modulation method.
Figure 8:
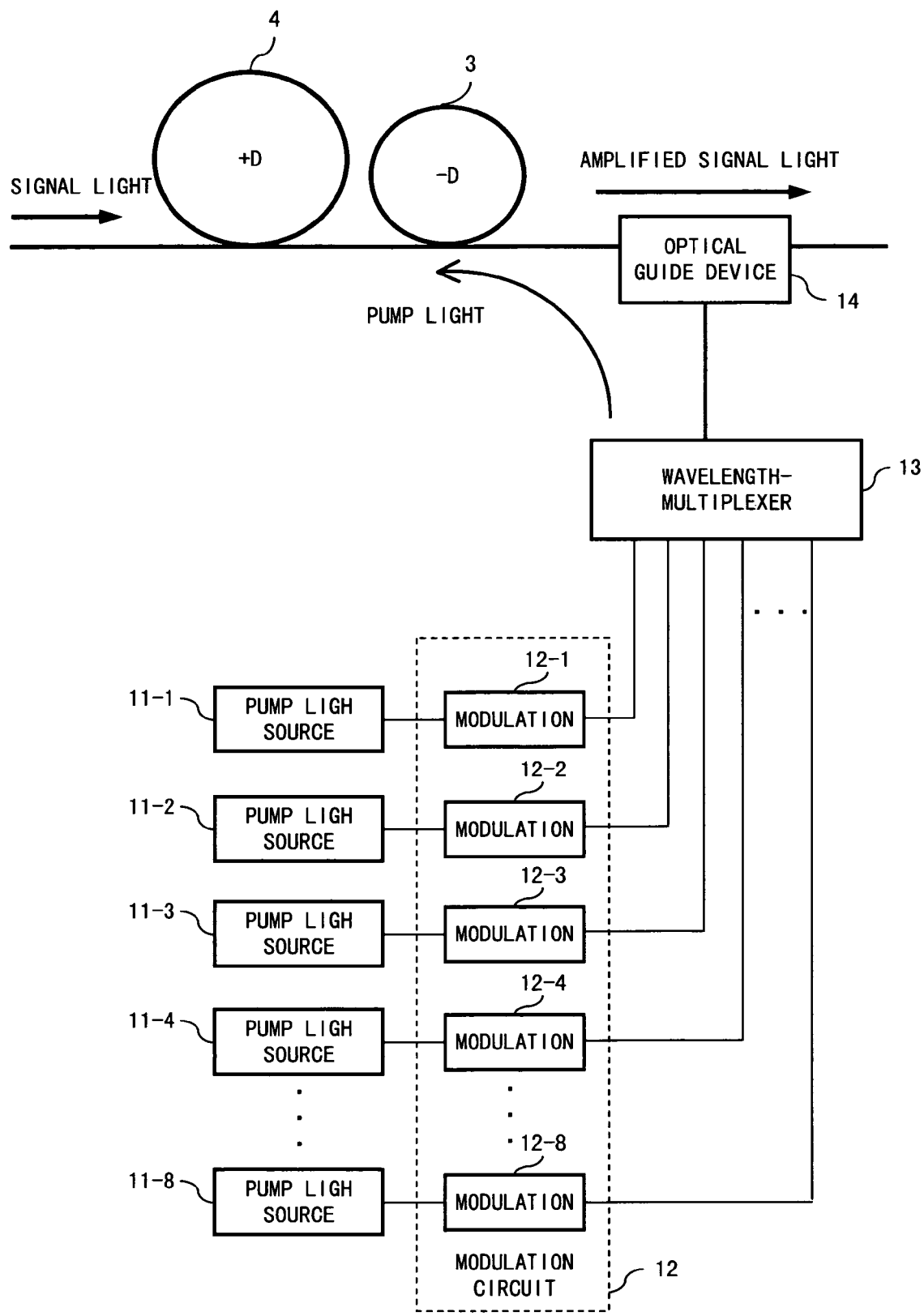
FIG. 8 shows the configuration of the Raman amplifier according to an embodiment of the present invention.

FIG. 8 shows the configuration of the Raman amplifier according to an embodiment of the present invention. The optical fiber (−D) 3 and the optical fiber (+D) 4 shown in FIG. 8 can use the optical fiber in the existing system shown in FIG. 1. That is, the optical fiber (+D) 4 is an optical fiber as a transmission medium forming a transmission line. The optical fiber (−D) 3 is an optical fiber of negative dispersion having a core diameter smaller than that of the optical fiber (+D) 4. The optical fiber (−D) 3 is a transmission medium for propagating signal light, and functions as an amplification medium for amplifying the signal light.

Pump light sources 11-1 through 11-8 generate plural variations of pump light having different frequencies. That is, the pump light sources 11-1 through 11-8 generate plural pump light having different wavelengths. The pump light sources 11-1 through 11-8 are realized by, for example, a laser light source, respectively.

A modulation circuit 12 comprises modulators 12-1 through 12-8, and modulates the pump light generated by the pump light sources 11-1 through 11-8. In this example, a light source and a modulator are separately described. However, as a modulation method, direct modulation for modulating the drive current of a light source can be used. A wavelength-multiplexer 13 wavelength-multiplexes plural variations of pump light modulated by the modulation circuit 12. The wavelength-multiplexer 13 is realized by, for example, a WDM coupler. An optical guide device 14 guides the plural variations of pump light wavelength-multiplexes by the wavelength-multiplexer 13 to the optical fiber (−D) 3. The optical guide device 14 is realized by, for example, a WDM coupler or an optical circulator. With this configuration, plural variations of pump light having different frequencies are supplied to an amplification medium (in this example, mainly to the optical fiber (−D) 3). That is, plural variations of pump light having different wavelengths are supplied to an amplification medium.

The Raman amplifier shown in FIG. 8 comprises eight pump light sources 11-1 through 11-8 and eight modulators 12-1 through 12-8, but the number of pump lights and modulators is not limited to eight. The Raman amplifier is configured for use in a backward-pumping method, but the present invention is not limited to this method, but can be configured for use in a forward-pumping method. Furthermore, in a transit section between nodes, it is not limited to a combination of a positive dispersion fiber (+D) and a negative dispersion fiber (+D), but one type of optical fiber can be used, or one or more positive dispersion fibers (+D) and one or more negative dispersion fiber (+D)s can be combined.

In the above-mentioned Raman amplifier, the signal light (WDM light) transmitted through the optical fiber (+D) 4 passes through the optical fiber (−D) 3. At this time, pump light is supplied to the optical fiber (−D) 3. That is, the optical fiber (−D) 3 functions as an amplification medium. Therefore, the signal light is amplified in the optical fiber (−D) 3.

Figure 9:
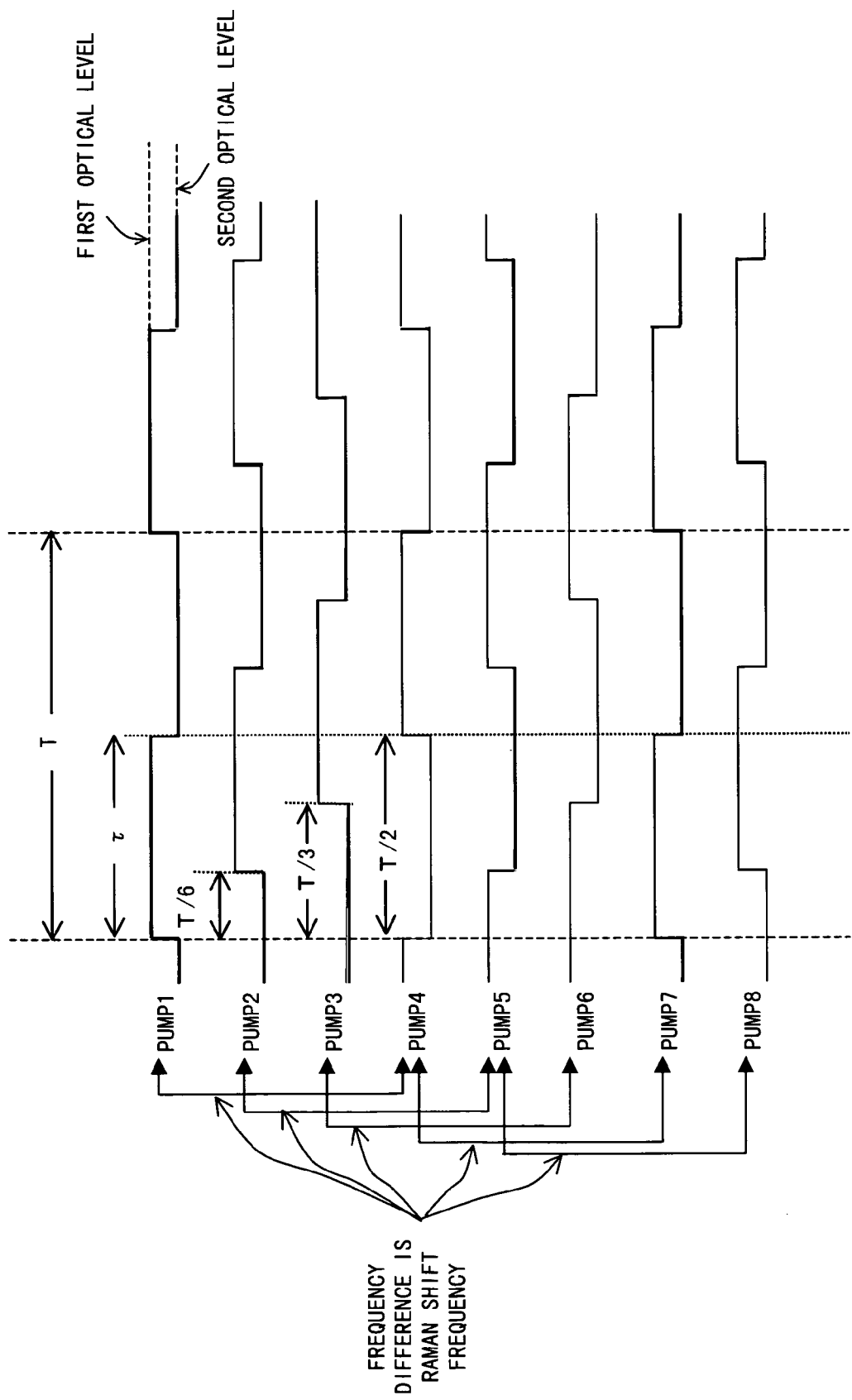
FIG. 9 shows an embodiment of the method of modulating pump light.

FIG. 9 shows an embodiment of a method for modulating pump light. In this example, the pump light sources 11-1 through 11-8 generate pump light 1 through 8 (PUMP 1 to PUMP 8) having different frequencies. The frequency of each pump light is determined based on the Raman shift frequency. That is, if the Raman shift frequency is represented by "$\Delta f(\text{Raman})$", the wavelength interval "$\Delta f(\text{Pump})$" set when pump light is arranged is represented by the following expression.

$$\Delta f(\text{pump}) = \Delta f(\text{Raman})/n \text{ (n is a natural number)}$$

The "Raman shift frequency" indicates, as described above, the difference between the frequency of pump light supplied to an optical fiber and the frequency showing a peak Raman gain obtained from the pump light, that is, about 13.2 THz. Therefore, if "n=3" is assigned in the above-mentioned expression, the pump light 1 through 8 are arranged at the intervals of about 4.4 THz. At this time, each of the frequency differences between the pump light 1 and the pump light 4, the frequency difference between the pump light 2 and the pump light 5, the frequency difference between the pump light 3 and the pump light 6, the frequency difference between the pump light 4 and the pump light 7, and the frequency difference between the pump light 5 and the pump light 8 equals the Raman shift frequency.

The pump light 1 through 8 are modulated in a predetermined modulation period T. The modulation period T is not specified, but can be about 100 kHz. Each pump light is modulated such that the first optical level and the second optical level can alternately be repeated in the modulation period T. The first optical level corresponds to an emission state. The second optical level corresponds to an extinct state or an emission state lower than the first optical level. However, for simple explanation in the description below, the first and second optical level are defined respectively as the emission state and the extinct state. That is, each pump light is modulated such that the emission state and the extinct state can be alternately repeated in the modulation period T. Furthermore, the duty of a modulation signal is 50 percents. That is to say, the time period in which the pump light enters the emission state is 50 percents of the modulation period T.

When the above-mentioned modulation is performed, the time period in which pump light is practically supplied to an optical fiber is half the time period in which the pump light is CW (continuous wave). Therefore, to maintain the pumping energy supplied to an optical fiber, it is necessary that the optical power supplied when the modulated pump light is in the emission state is twice as large as the optical power used when the pump light is continuous wave.

The modulation circuit 12 sequentially delays the pump light 2 through the pump light 8 based on the pump light 1. That is, the modulation signals of the pump light 2, 3, 4, 5, 6, 7, and 8 are obtained by delaying the modulation signal of the pump light 1 by T/6, 2T/6, 3T/6, 4T/6, 5T/6, 6T/6, and 7T/6, respectively.

As a result, the modulation signal of the pump light 1 and the modulation signal of the pump light 4 are opposite in phase. That is, when the pump light 1 is in the emission state, the pump light 4 is in the extinct state, and when the pump light 1 is in the extinct state, the pump light 4 is in the emission state. In other words, the pump light 1 and the pump light 4 are controlled not to simultaneously enter the emission state. The relationship is the same between the pump light 2 and the pump light 5, between the pump light 3 and the pump light 6, between the pump light 4 and the pump light 7, and between the pump light 5 and the pump light 8. Thus, in the Raman amplifier according to the present embodiment, each of the pairs of pump light (in this embodiment, pump light 1 and 4, pump light 2 and 5, pump light 3 and 6, pump light 4 and 7, pump light 5 and 8) are controlled not to simultaneously enter the emission state.

In the present embodiment, a set of pump light whose frequency difference equals the Raman shift frequency is controlled not to simultaneously enter the emission state. However, the frequency difference between a set of pump light to be controlled not to simultaneously enter the emission state does not have to strictly equal the Raman shift frequency, but can be in a substantially acceptable scope of the Raman shift frequency. For example, the first pump light and the second pump light can be controlled not to simultaneously enter the emission state, when the second pump light is arranged in a frequency area in which the Raman gain obtained from the first pump light supplied to an optical fiber is close to the peak gain.

Described below is the suppression of the pump-to-pump phenomenon in the Raman amplifier.

Figure 10:
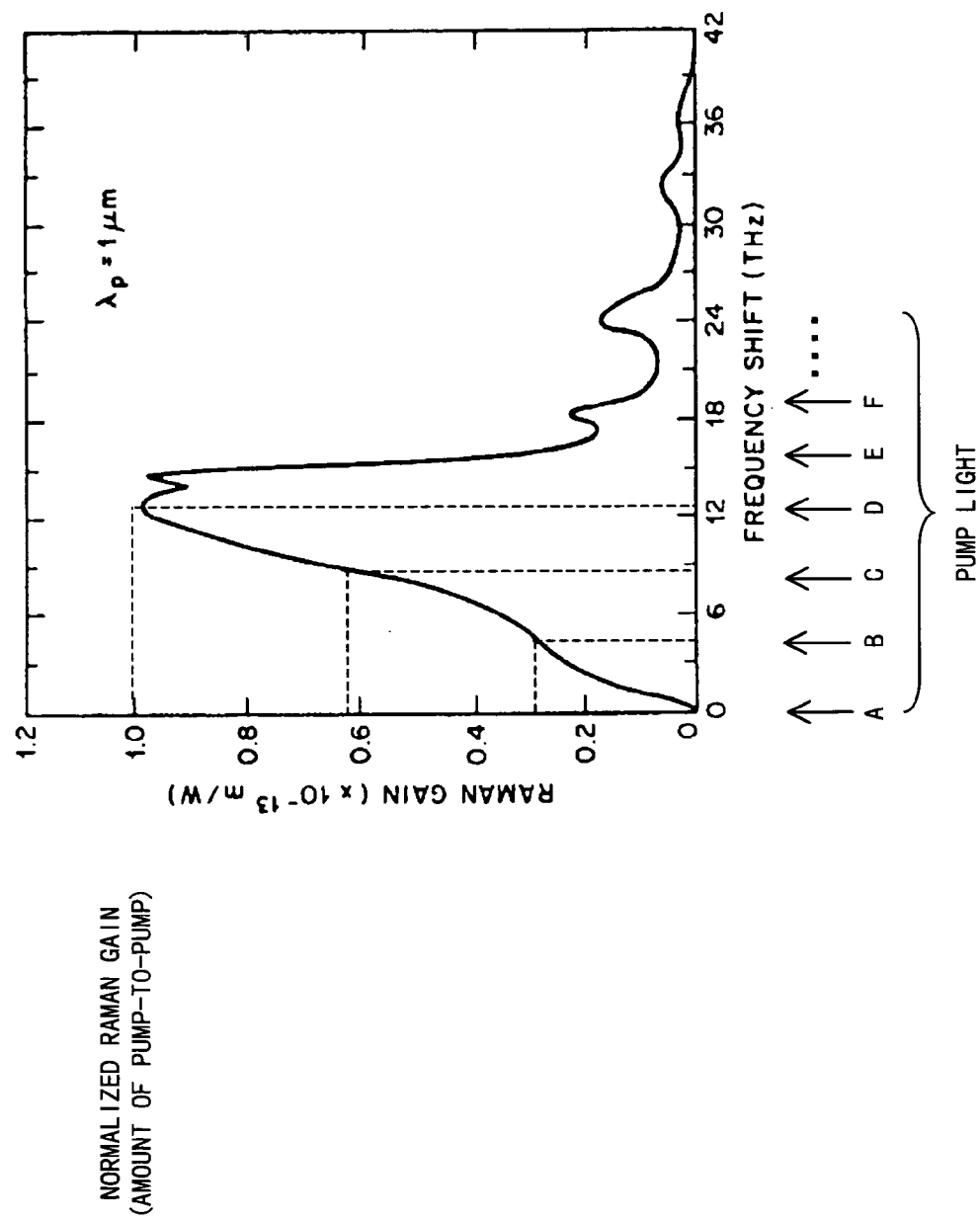
FIG. 10 shows the relationship between a pump light frequency and a Raman gain.

FIG. 10 shows the relationship between the pump light frequency and the Raman gain. In FIG. 10, the pump light A, B, C, . . . correspond to plural variations of pump light generated by the pump light sources 11-1 through 11-8, and are arranged at the intervals of 4.4 THz (⅓ of the Raman shift frequency). The pump light A is reference pump light when a pump-to-pump phenomenon is considered. For example, if the pump light A is assumed to be the pump light 1, the pump light B, C, D, . . . correspond to the pump light 2, 3, 4, . . . . Otherwise, if the pump light A is assumed to be the pump light 2, the pump light B, C, D, . . . correspond to the pump light 3, 4, 5, . . . . In FIG. 10, the Raman gain is normalized such that when the pump light A is supplied, the Raman gain at the frequency reached by shifting the frequency from the pump light A by the Raman shift frequency can indicate "1". That is, in FIG. 10, the Raman gain is normalized based on the largest gain obtained when the pump light A is supplied. Described below is the effect of suppressing the pump-to-pump phenomenon under the above-mentioned condition.

Assume that each pump light is a continuous wave. Then, the amount of pump-to-pump relating to pump light (pump light A in FIG. 10) among plural variations of pump light. The "amount of pump-to-pump" is assumed to correspond to the energy transferred between pump light, and to be proportional to the Raman gain.

In FIG. 10, the pump light D is arranged at the frequency obtained by shifting from the frequency of the pump light A by the Raman shift frequency. Therefore, the amount of pump-to-pump between the pump light A and the pump light D is the largest. In the description below, the largest amount of pump-to-pump (between the pump light A and the pump light D) is defined as "1". In this case, the amount of pump-to-pump between the pump light A and the pump light B is "0.30", and the amount of pump-to-pump between the pump light A and the pump light C is "0.62". As shown in FIG. 10, the Raman gain obtained by the pump light A is quickly decreases when the frequency difference from the pump light A is larger than the Raman shift frequency. Therefore, the amount of pump-to-pump related to the pump light A is rather small, when it is related to the pump light having a frequency difference from the pump light A is larger than the Raman shift frequency. Therefore, for simple explanation in the description below, the amount of pump-to-pump between the pump light indicating a frequency difference larger than the Raman shift frequency is to be ignored (assumed to be zero).

The amount of pump-to-pump relating to arbitrary pump light when each pump light is a continuous wave under the above-mentioned condition can be calculated as follows.

amount of pump-to-pump=0.30+0.62+1=1.92

Then, arbitrary pump light (pump light 1 in this example) when the modulation shown in FIG. 9 is applied is calculated. When each pump light is modulated, the time in which one set of pump light is in the emission state depends on the combination of the pump light. That is, as shown in FIG. 11, when the phase difference between pump light becomes larger, the time period in which the related pump light simultaneously enters the emission state is shorter, and the energy transferred between the pump light is also reduced. For example, when the modulation shown in FIG. 9 is performed, the time period in which the pump light 1 and the pump light 2 simultaneously enter the emission state is only "T/3" in the modulation period T. Also, the time period in which the pump light 1 and the pump light 3 simultaneously enter the emission state is only "T/6" in the modulation period T, and the time period in which the pump light 1 and the pump light 4 simultaneously enter the emission state is "0".

Therefore, in this case, the amount of pump-to-pump related to the pump light 1 is calculated as follows.

amount of pump-to-pump=2×{(0.30×⅓)+(0.62×⅙)+ (1×0)}=0.41

Thus, when each pump light is modulated as shown in FIG. 9, the amount of pump-to-pump relating to one pump light can be maintained around 20 percents of the value obtained when a continuous wave is used as pump light. In the expression above, the right side is multiplied by "2" because desired optical peak power is doubled with the duty assumed to be 50 percents.

In the example shown in FIG. 9, the duty of the modulation signal is set at 50 percents. However, the present invention is not limited to this application. The case in which the duty of the modulation signal is 33 percents, and the case in which the duty of the modulation signal is 25 percents are explained below.

Figure 12:
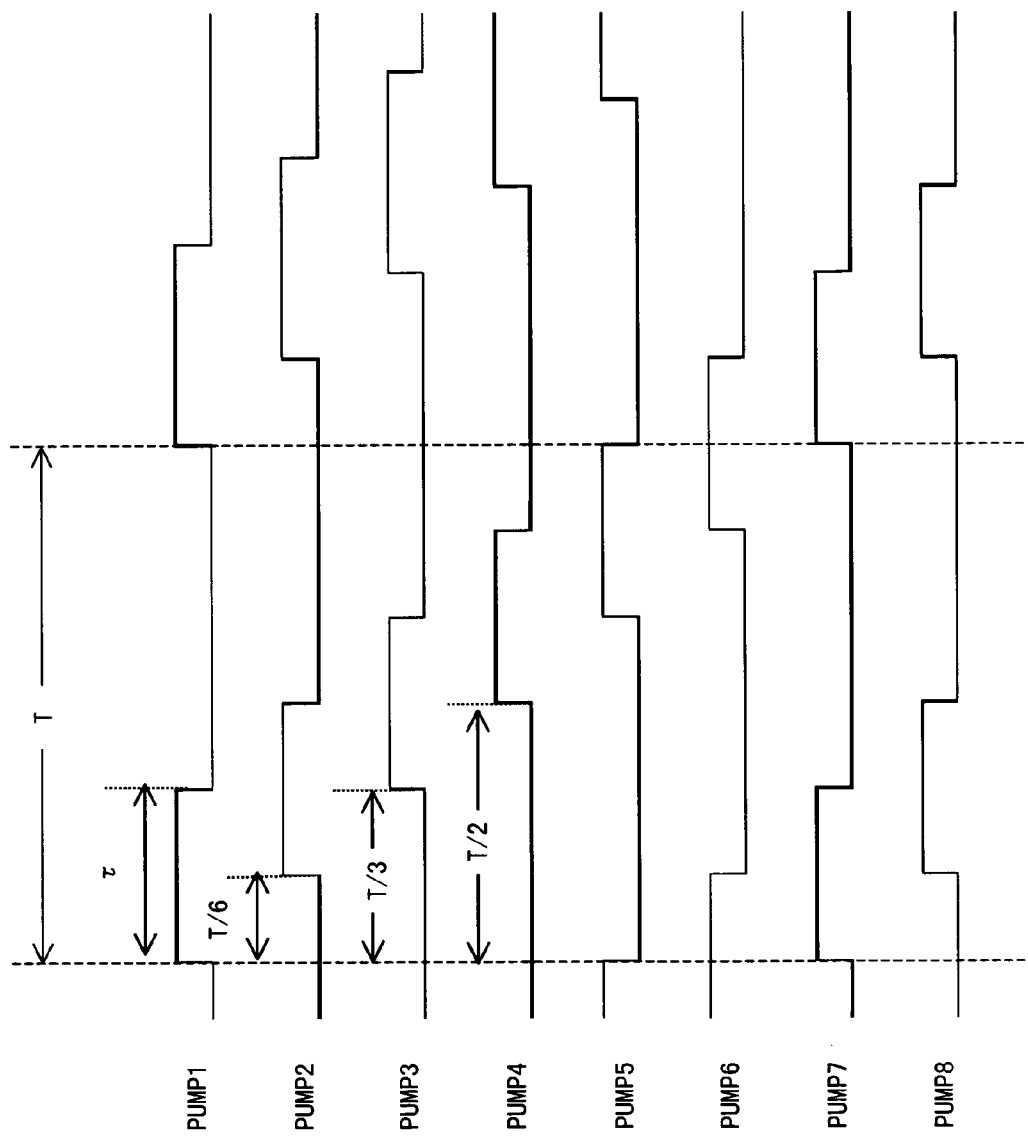
FIG. 12 shows an embodiment when each pump light is modulated with a duty of 33 percents.

FIG. 12 shows an embodiment of the case in which each pump light is modulated with the duty of 33 percents. Each of the frequency differences between the pump light 1 and the pump light 4, between the pump light 2 and the pump light 5, between the pump light 3 and the pump light 6, between the pump light 4 and the pump light 7, and between the pump light 5 and the pump light 8 is the Raman shift frequency, which is the same as the example shown in FIG. 9. The phases of the pump light 1 through the pump light 8 are sequentially delayed by T/6, which is also the same as the example shown in FIG. 9. However, the optical peak power obtained when the modulated pump light is in the emission state is three times as high as the optical power obtained when the pump light is a continuous wave.

The amount of pump-to-pump related to one pump light is calculated. First, the time period in which the pump light 1 and the pump light 2 simultaneously enter the emission state is only "T/6" in the modulation period T. Each of the time period in which the pump light 1 and the pump light 3, and time period in which the pump light 1 and the pump light 4 simultaneously enter the emission state is "0", respectively. Therefore, the amount of pump-to-pump related to the pump light 1 is computed as follows.

amount of pump-to-pump=3×{(0.30×⅙)+(0.62×0)+ (1×0)}=0.15

Thus, if each pump light is modulated with the duty of 33 percents as shown in FIG. 12, the amount of pump-to-pump related to one pump light can be less than 10 percents of the value obtained when a continuous wave is used as pump light. That is, by lowering the duty of the modulation signal, the amount of pump-to-pump can be further reduced.

Figure 13:
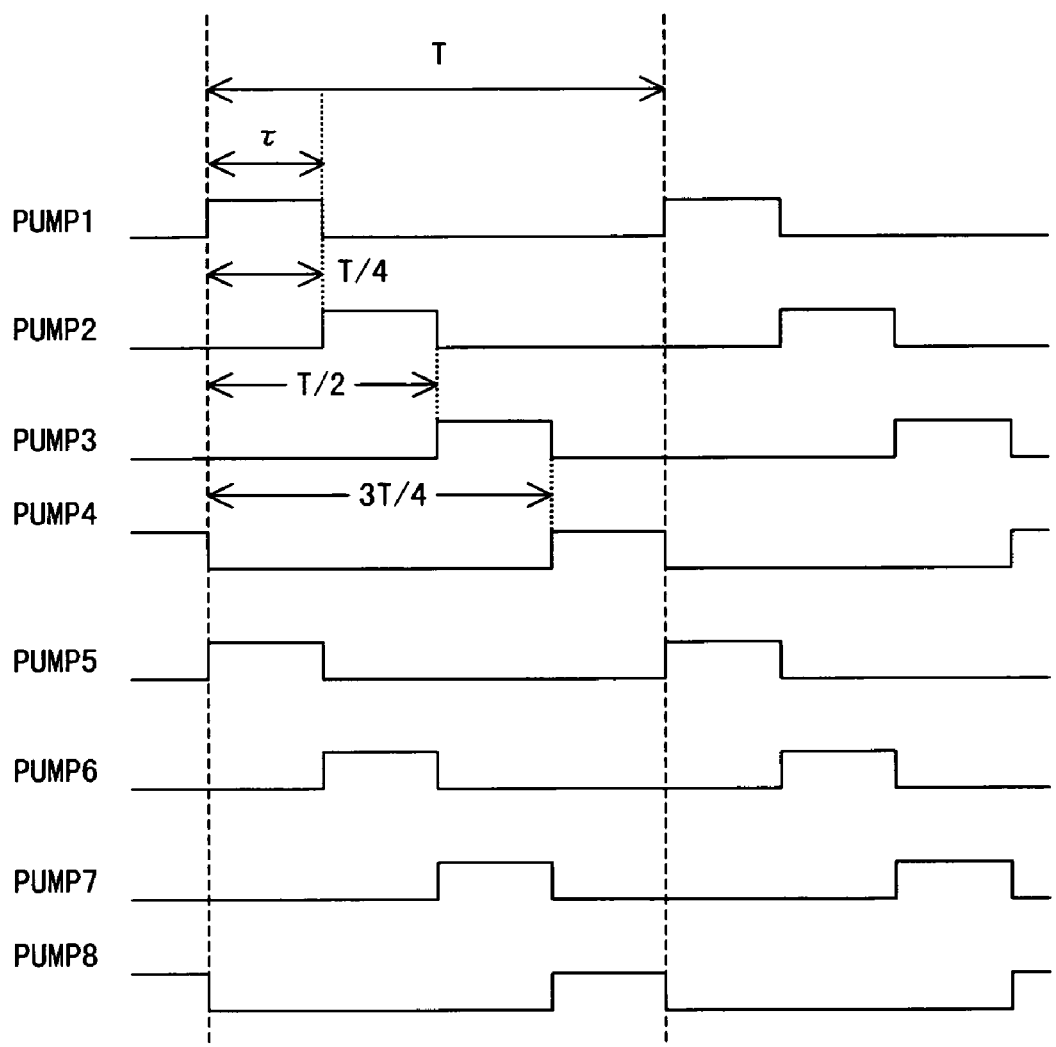
FIG. 13 shows an embodiment when each pump light is modulated with a duty of 25 percents.

FIG. 13 shows an embodiment of modulating pump light with the duty of 25 percents. Each of the frequency differences between the pump light 1 and the pump light 4, between the pump light 2 and the pump light 5, between the pump light 3 and the pump light 6, between the pump light 4 and the pump light 7, and between the pump light 5 and the pump light 8 is the Raman shift frequency, which is the same as in the example shown in FIG. 9. However, the phases of the pump light 1 through the pump light 8 are sequentially delayed by T/4. The optical power obtained when the modulated pump light is in the emission state is four times as large as the optical power obtained when the pump light is a continuous wave.

In this case, in the period in which the pump light 1 is in the emission state, the pump light 2, 3, and 4 are in the extinct state. Therefore, the amount of pump-to-pump related to the pump light 1 is zero.

Thus, if each pump light is modulated with the duty of 25 percents as shown in FIG. 13, the amount of pump-to-pump related to one pump light is zero when the amount of pump-to-pump between pump light having a frequency difference larger than the Raman shift frequency is ignored, and the wavelength dispersion in the transmission line is also ignored. That is, the amount of pump-to-pump related to one pump light can be suppressed by reducing the duty of the modulation signal as shown in FIG. 14. However, to reduce the duty of the modulation signal, it is necessary to correspondingly increase the optical peak power when the pump light is in the emission state, thereby possibly lowering the noise characteristic and requiring the preparation of a light source of large optical output. Therefore, the duty of a modulation signal can be determined to optimize the balance between an amount of pump-to-pump and noise.

When the duty of a modulation signal for modulation of pump light exceeds 50 percents, it is not possible to allow a set of pump light whose frequency difference equals a Raman shift frequency to simultaneously enter an emission state. However, even the duty of a modulation signal for modulation of pump light exceeds 50 percents, the amount of pump-to-pump can be suppressed as compared with the case in which a continuous wave is used as pump light as shown in FIG. 14.

Described below is the total amount of pump-to-pump in the entire Raman amplifier. In this embodiment of the Raman amplifier, the pump light 1 through the pump light 8 are arranged at equal intervals in the band of 30.8 THz, and the gain bandwidth is assumed to be about 230 nm. The pump light 1 through the pump light 8 are also assumed to be modulated as shown in FIG. 9. For simple explanation in the description below, it is assumed that the amount of pump-to-pump between the pump light having a frequency difference larger than the Raman shift frequency is ignored.

Amount of pump-to-pump between:

pump light 1 and pump light 2=2×0.30×⅓=0.20;

pump light 1 and pump light 3=2×0.62×⅙=0.20;

pump light 1 and pump light 4=2×1×0=0;

pump light 1 and pump light 5=2×0×⅙=0;

pump light 1 and pump light 6=2×0×⅓=0;

pump light 1 and pump light 7=2×0×½=0; and pump light 1 and pump light 8=2×0×⅓=0

Amount of pump-to-pump between:

pump light 2 and pump light 3=2×0.30×⅓=0.20;

pump light 2 and pump light 4=2×0.62×⅙=0.20;

pump light 2 and pump light 5=2×1×0=0;

pump light 2 and pump light 6=2×0×⅙=0;

pump light 2 and pump light 7=2×0×⅓=0; and pump light 2 and pump light 8=2×0×½=0

Amount of pump-to-pump between:

pump light 3 and pump light 4=2×0.30×⅓=0.20;

pump light 3 and pump light 5=2×0.62×⅙=0.20;

pump light 3 and pump light 6=2×1×0=0;

pump light 3 and pump light 7=2×0×⅙=0; and pump light 3 and pump light 8=2×0×⅓=0

Amount of pump-to-pump between:

pump light 4 and pump light 5=2×0.30×⅓=0.20;

pump light 4 and pump light 6=2×0.62×⅙=0.20;

pump light 4 and pump light 7=2×1×0=0; and pump light 4 and pump light 8=2×0×⅙=0

Amount of pump-to-pump between:

pump light 5 and pump light 6=2×0.30×⅓=0.20;

pump light 5 and pump light 7=2×0.62×⅙=0.20; and pump light 5 and pump light 8=2×1×0=0

Amount of pump-to-pump between:

pump light 6 and pump light 7=2×0.30×⅓=0.20; and pump light 6 and pump light 8=2×0.62×1;6=0.20

Amount of pump-to-pump between pump light 7 and pump light 8=2×0.30×1;3=0.20

Therefore, in this embodiment, the total amount of pump-to-pump in the entire Raman amplifier is "2.6".

Described below is the comparison between the Raman amplifier according to the present embodiment and the Raman amplifier described in the above-mentioned non-patent application document 1. However, assume that, in the Raman amplifier described in the non-patent application document 1, the gain bandwidth is smaller than the bandwidth corresponding to the Raman shift frequency. Therefore, in the description below, the comparison is made with the configuration obtained by simply extending the modulation method described in the non-patent application document 1.

Figure 15:
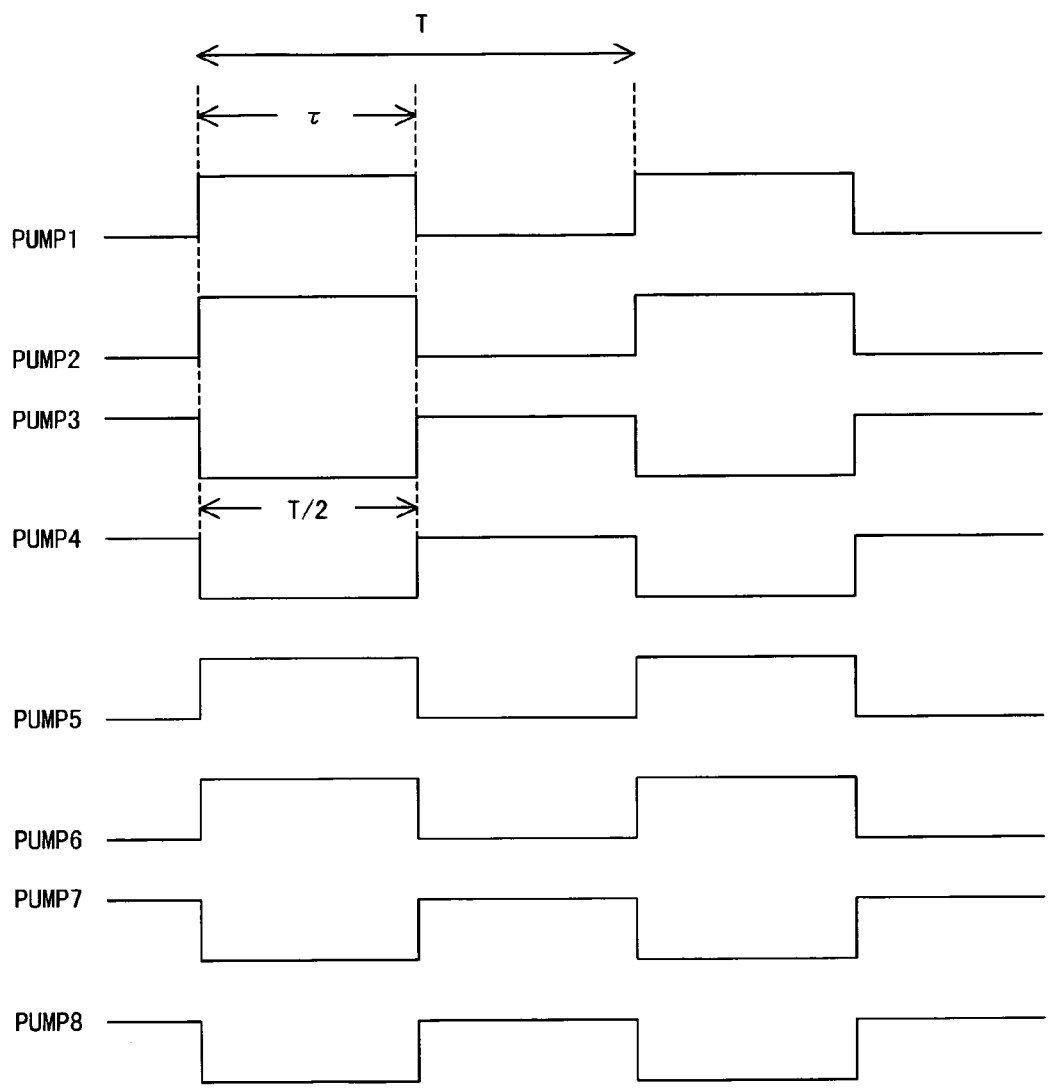
FIG. 15 shows a modulation method obtained by extending a well-known modulation method to a wider band.

FIG. 15 shows the modulation method obtained by extending the modulation method described in the non-patent application document 1 in a broader band. In FIG. 15, for easier comparison between the present invention and the non-patent application document 1, the pump light 1 through 8 are arranged at the intervals of 4.4 THz.

In the modulation method described in the non-patent application document 1, the pump light 1 and the pump light 2 are in phase, and the pump light 3 and the pump light 4 are in phase. The modulation is performed such that when the pump light 1 and the pump light 2 are in the emission state, the pump light 3 and the pump light 4 are in the extinct state, and that when the pump light 1 and the pump light 2 are in the extinct state, the pump light 3 and the pump light 4 are in the emission state. Therefore, the modulation is performed such that when the modulation method is extended to 8 waves of pump light 1 through 8, the pump light 1, 2, 5, and 6 are in the emission state while the pump light 3, 4, 7, and 8 are in the extinct state, and the pump light 1, 2, 5, and 6 are in the extinct state while the pump light 3, 4, 7, and 8 are in the emission state.

Using the above-mentioned model, the amount of pump-to-pump of the entire Raman amplifier can be calculated as described below. Also in the following explanation, it is assumed that the amount of pump-to-pump between the pump light having the frequency difference larger than the Raman shift frequency is ignored.

Amount of pump-to-pump between:

pump light 1 and pump light 2=2×0.30×½=0.30;

pump light 1 and pump light 3=2×0.62×0=0;

pump light 1 and pump light 4=2×1×0=0;

pump light 1 and pump light 5=2×0×½=0;

pump light 1 and pump light 6=2×0×½=0;

pump light 1 and pump light 7=2×0×0=0; and pump light 1 and pump light 8=2×0×0=0

Amount of pump-to-pump between:

pump light 2 and pump light 3=2×0.30×0=0;

pump light 2 and pump light 4=2×0.62×0=0;

pump light 2 and pump light 5=2×1×½=1.0;

pump light 2 and pump light 6=2×0×½=0;

pump light 2 and pump light 7=2×0×0=0; and pump light 2 and pump light 8=2×0×0=0

Amount of pump-to-pump between:

pump light 3 and pump light 4=2×0.30×½=0.30;

pump light 3 and pump light 5=2×0.62×0=0;

pump light 3 and pump light 6=2×1×0=0;

pump light 3 and pump light 7=2×0×½=0; and pump light 3 and pump light 8=2×0×½=0

Amount of pump-to-pump between:

pump light 4 and pump light 5=2×0.30×0=0;

pump light 4 and pump light 6=2×0.62×0=0;

pump light 4 and pump light 7=2×1×½=1.0; and pump light 4 and pump light 8=2×0×½=0

Amount of pump-to-pump between:

pump light 5 and pump light 6=2×0.30×½=0.30;

pump light 5 and pump light 7=2×0.62×0=0; and pump light 5 and pump light 8=2×1×0=0

Amount of pump-to-pump between:

pump light 6 and pump light 7=2×0.30×0=0; and pump light 6 and pump light 8=2×0.62×0=0

Amount of pump-to-pump between pump light 7 and pump light 8=2×0.30×½=0.30

Therefore, in this case, the total amount of pump-to-pump of the entire Raman amplifier is "3.2".

Thus, with the configuration obtained by extending the system described in the non-patent application document 1, the amount of pump-to-pump is larger than with the configuration according to the embodiment of the present invention for the following reason. That is, with the configuration obtained by extending the system described in the non-patent application document 1, for example, the frequency difference between the pump light 2 and the pump light 5 equals the Raman shift frequency, but the phases of the pump light match each other. The relationship also holds true between the pump light 4 and the pump light 7.

On the other hand, since each pump light is modulated such that the pump light having the frequency difference equal to the Raman shift frequency cannot simultaneously enter the emission state in the Raman amplifier according to the embodiment of the present invention, the total amount of pump-to-pump is suppressed. Since the total amount of pump-to-pump is suppressed, the noise characteristic of the Raman amplifier can be improved. Additionally, the power of plural variations of pump light for acquisition of a constant gain over a wide band can be easily controlled. That is, a gain tilt can be easily controlled.

Figure 16:
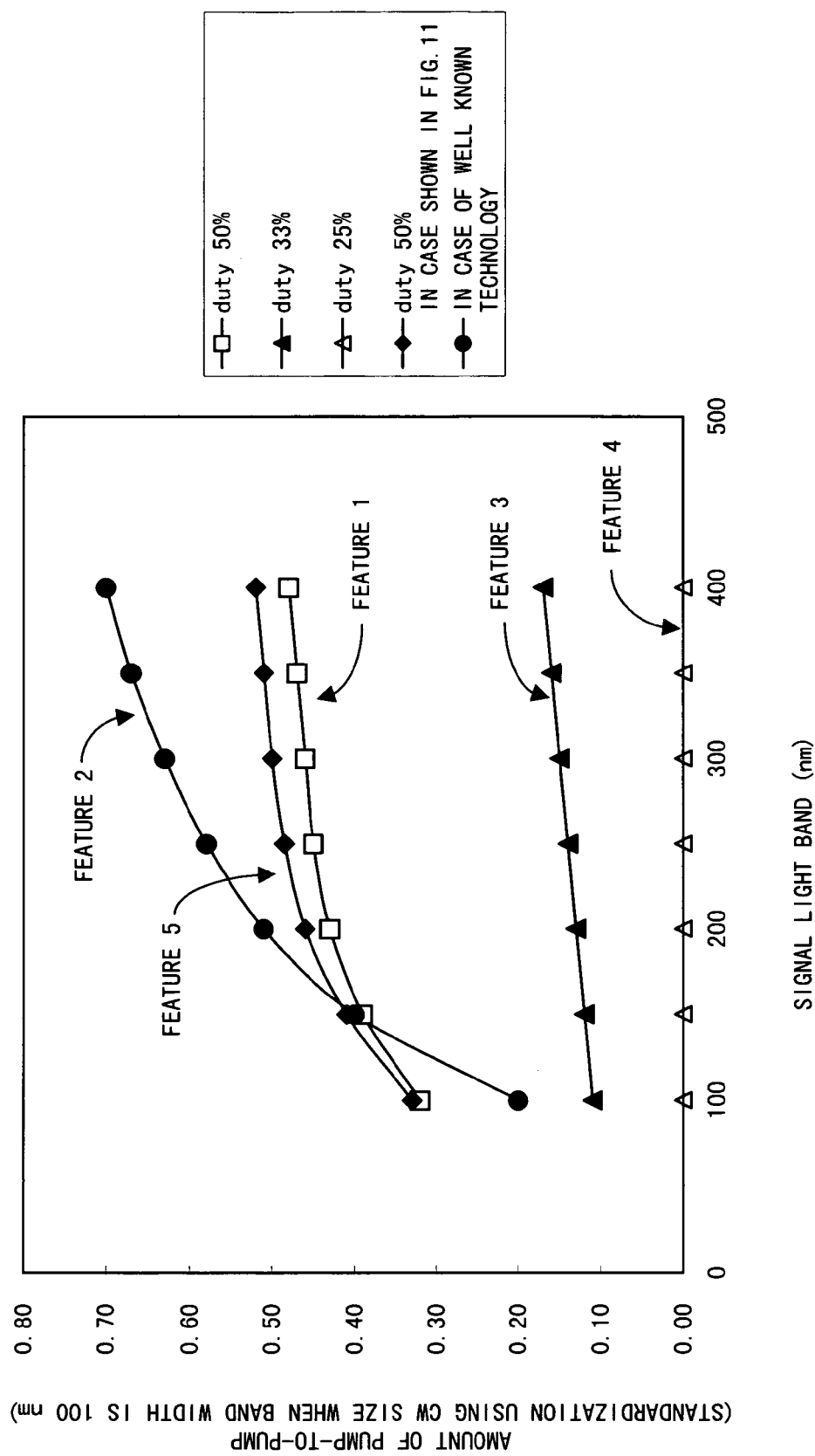
FIG. 16 shows the relationship between the gain bandwidth and the amount of pump-to-pump.

FIG. 16 shows the relationship between the gain bandwidth and the amount of pump-to-pump. In FIG. 16, four waves of pump light are arranged at the intervals of 4.4 THz. The normalization is conducted with the amount of pump-to-pump defined as "1" when each pump light is a continuous wave. "Feature 1," indicates the amount of pump-to-pump of the Raman amplifier according to an embodiment of the present invention. "Feature 2" indicates the amount of pump-to-pump of the Raman amplifier with the configuration obtained by extending the system described in the non-patent application 1. Thus, the larger the gain bandwidth, the more outstanding the advantage of the Raman amplifier according to the embodiment of the present invention.

The "feature 3" and "feature 4" indicates the amount of pump-to-pump when the duty of the modulation signal is set at 33 percents and 25 percents in the respective embodiments of the Raman amplifier. Thus, the shorter the emission time of each pump light, the more effectively the pump-to-pump phenomenon can be suppressed.

In the above-mentioned embodiment, the configuration with which plural variations of pump light are arranged at the intervals of 4.4 THz, but the present invention is not limited to this configuration. That is, when the Raman shift frequency is expressed by "Δf(Raman)", the wavelength interval "Δf(pump) set when the pump light is arranged is represented by the following equation.

$$\Delta f(\text{pump}) = \Delta f(\text{Raman})/n \text{ (} n \text{ is a natural number.)}$$

FIG. 17 shows the modulation method used when "n=4" in the equation above. In this case, the pump light 1 through the pump light 8 are sequentially arranged at the intervals of 3.3 THz. In this modulation method, the frequency difference between the pump light 1 and the pump light 5, the pump light 2 and the pump light 6, the pump light 3 and the pump light 7, and the pump light 4 and the pump light 8 equals the Raman shift frequency, respectively. On the other hand, the pump light 1 through the pump light 8 are sequentially delayed by ⅛ time of the modulation period. As a result, the pump light related to a frequency difference equal to the Raman shift frequency cannot simultaneously enter the emission state.

When "n=3" is assigned in the relational expression, the pump light 1 through the pump light 8 are sequentially delayed by ⅙ time of the modulation period as described above by referring to FIG. 9. Furthermore, if "n=4" is assigned in the relational expression, the pump light 1 through the pump light 8 are sequentially delayed by ⅛ time of the modulation period as described above by referring to FIG. 17. Therefore, the relationship between the wavelength interval and the delay time of the pump light is expressed by the following equation.

$$\text{delay time of pump light } i \text{ from the pump light } 1 = T \times (i-1)/(2 \times n)$$

This expression is based on the arrangement of the variations of the pump light at equal intervals. Therefore, when the frequency of the pump light is arranged at unequal intervals, the delay time of each pump light is set depending on the arrangement.

Plural variations of pump light can be arranged in accordance with the following relational expression.

$$\Delta f(\text{pump}) = \Delta f(\text{Raman})/(n+0.5) \text{ (} n \text{ is a natural number.)}$$

Figure 18:
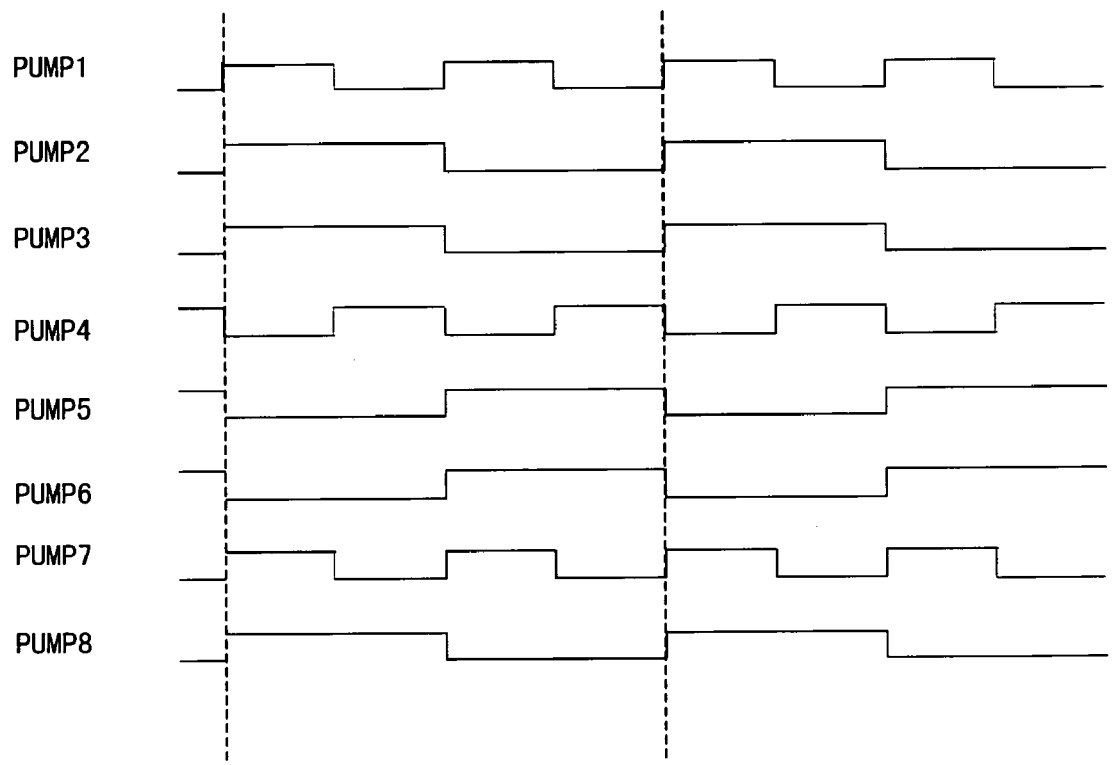
FIG. 18 shows an example of a further modulation method.

FIG. 18 shows another modulation method. In this modulation method, the pump light 1 through the pump light 8 are modulated using plural types of modulation signals. However, even in this case, a set of pump light having a frequency difference equal to the Raman shift frequency is modulated using modulation signals having opposite phases. For example, in FIG. 18, the pump light source 1 and the pump light 4 are modulated such that the pump light 4 enters the extinct state when the pump light 1 is in the emission state, and the pump light 4 enters the emission state when the pump light 1 is in the extinct state. The relationship is also maintained between the pump light 2 and the pump light 5, between the pump light 3 and the pump light 6, between the pump light 4 and the pump light 7, an between the pump light 5 and the pump light 8, respectively.

Figure 19:
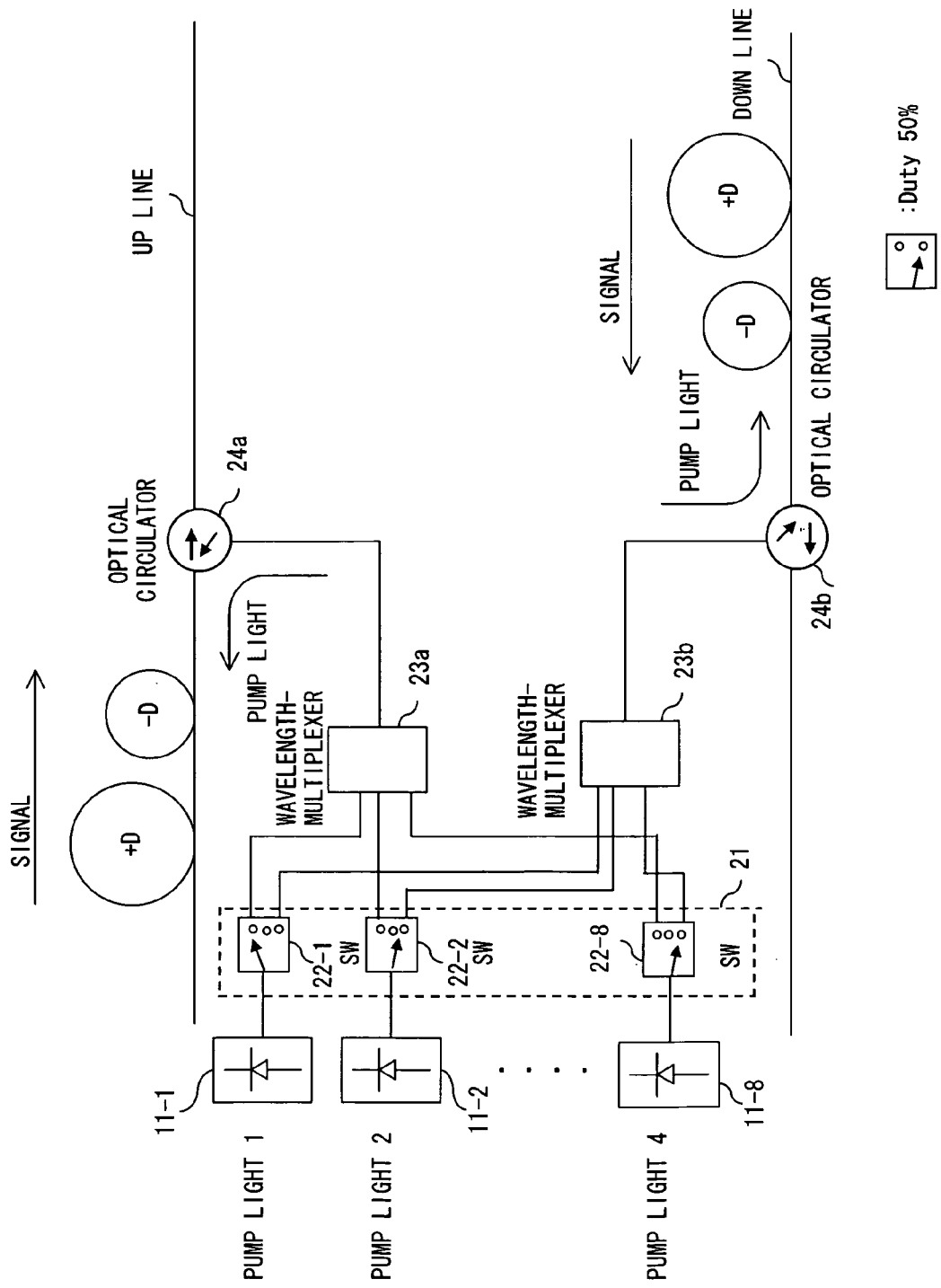
FIG. 19 shows the configuration of a Raman amplifier according to another embodiment of the present invention.

FIG. 19 shows the configuration of the Raman amplifier according to another embodiment of the present invention. This Raman amplifier amplifies a WDM signal transmitted through a set of transmission lines (for example, an up line and a down line) to which pump light is supplied.

The pump light sources 11-1 through 11-8 generate the pump light 1 through pump light 8 having different frequencies. A modulation circuit 21 comprises optical switches 22-1 through 22-8, and modulates the pump light 1 through pump light 8, respectively.

The optical switches 22-1 through 22-8 guide the pump light 1 through pump light 8 generated by the corresponding pump light sources 11-1 through 11-8 to a wavelength-multiplexer 23*a* or 23*b* according to a modulation signal provided from a control circuit not shown in the attached drawings. Practically, each of the optical switches 22-1 through 22-8 is controlled to be in one of the "state of guiding input light to the wavelength-multiplexer 23*a*", "state of guiding input light to the wavelength-multiplexer 23*b*", and "non-output state". For example, when the pump light of 50 percents duty is supplied to the up line and the down line as shown in FIG. 9, each of the optical switches 22-1 through 22-8 is controlled to alternately show for an equal time the "state of guiding input light to the wavelength-multiplexer 23*a*", "state of guiding input light to the wavelength-multiplexer 23*b*". The phase of a modulation signal supplied to the optical switches 22-1 through 22-8 is sequentially delayed for a plurality of time. For example, in the modulation method shown in FIG. 9, the modulation signal supplied to the optical switches 22-1 through 22-8 is sequentially delayed by a time corresponding to ⅙ of the modulation period.

The wavelength-multiplexers 23a and 23b wavelength-multiplexes the pump light 1 through pump light 8 modulated by the modulation circuit 22, and guides them to the optical circulators 24a and 24b, respectively. The optical circulator 24a supplies the pump light wavelength-multiplexed by the wavelength-multiplexer 23a to the transmission medium of the up line, and guides a WDM signal propagated from the upstream of the up line to downstream. Similarly, optical circulator 24b supplies the pump light wavelength-multiplexed by the wavelength-multiplexer 23b to the transmission medium of the down line, and guides a WDM signal propagated from the upstream of the down line to downstream.

With this configuration, the pump light generated by each pump light source is modulated by corresponding one modulation circuit and guided to a plurality of line, thereby simplifying the configuration of the circuit of the Raman amplifier. The pump light generated by each pump light source is efficiently supplied to a plurality of transmission lines.

Described below is the configuration of the circuit (pump light sources 11-1 through 11-8, modulation circuit 12 or 22) for generating modulated pump light.

Figure 20:
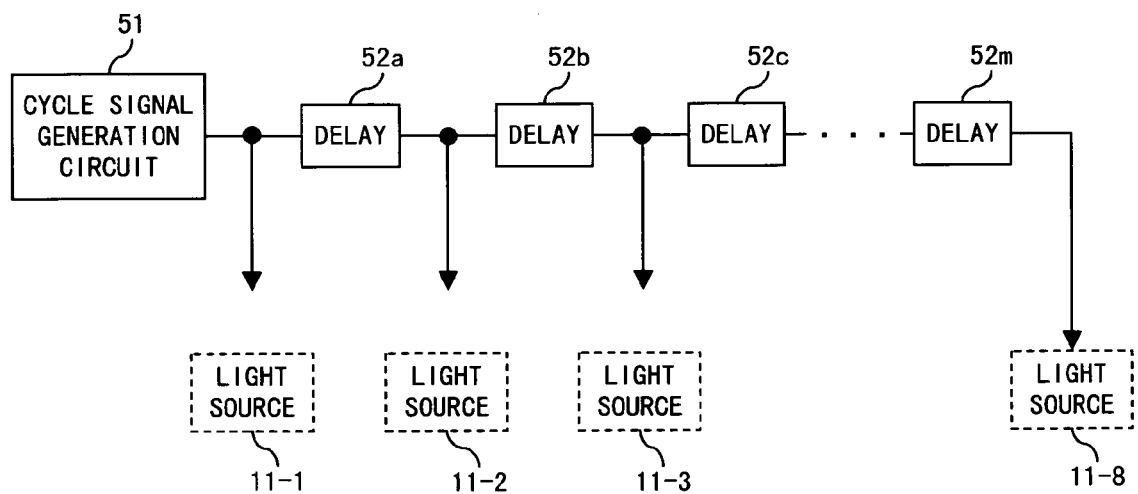
FIG. 20 shows an embodiment of a circuit for generating a drive signal for driving a pump light source.

FIG. 20 shows an embodiment of the drive signal generation circuit for generating a drive signal for driving the pump light sources 11-1 through 11-8. The drive signal generation circuit is provided in, for example, the modulation circuit 12.

The drive signal generation circuit comprises a cycle signal generation circuit 51 and a plurality of delay circuits 52a through 52m. The cycle signal generation circuit 51 generates a cyclic wave of the modulation period T. The cycle signal generation circuit 51 generates a signal having the duty of 50 percents in the embodiment, etc. shown in FIG. 9. In the embodiments shown in FIGS. 12 and 13, signals having the duty of 33 percents and 25 percents are generated, respectively.

The delay circuits 52a through 52m delay the signal output from the cycle signal generation circuit 51 or the signal output from the delay circuit at the preceding stage. The delay time of each of the delay circuits 52a through 52m is, for example, "T/6" in the embodiment shown in FIG. 9, and "T/4" in the embodiment shown in FIG. 13. The cycle signal output from the cycle signal generation circuit 51 is supplied as a drive signal to the pump light 11-1, and each delay signal output from the delay circuits 52a through 52m is supplied as a drive signal to a corresponding pump light sources 11-1 through 11-8.

Figure 21:
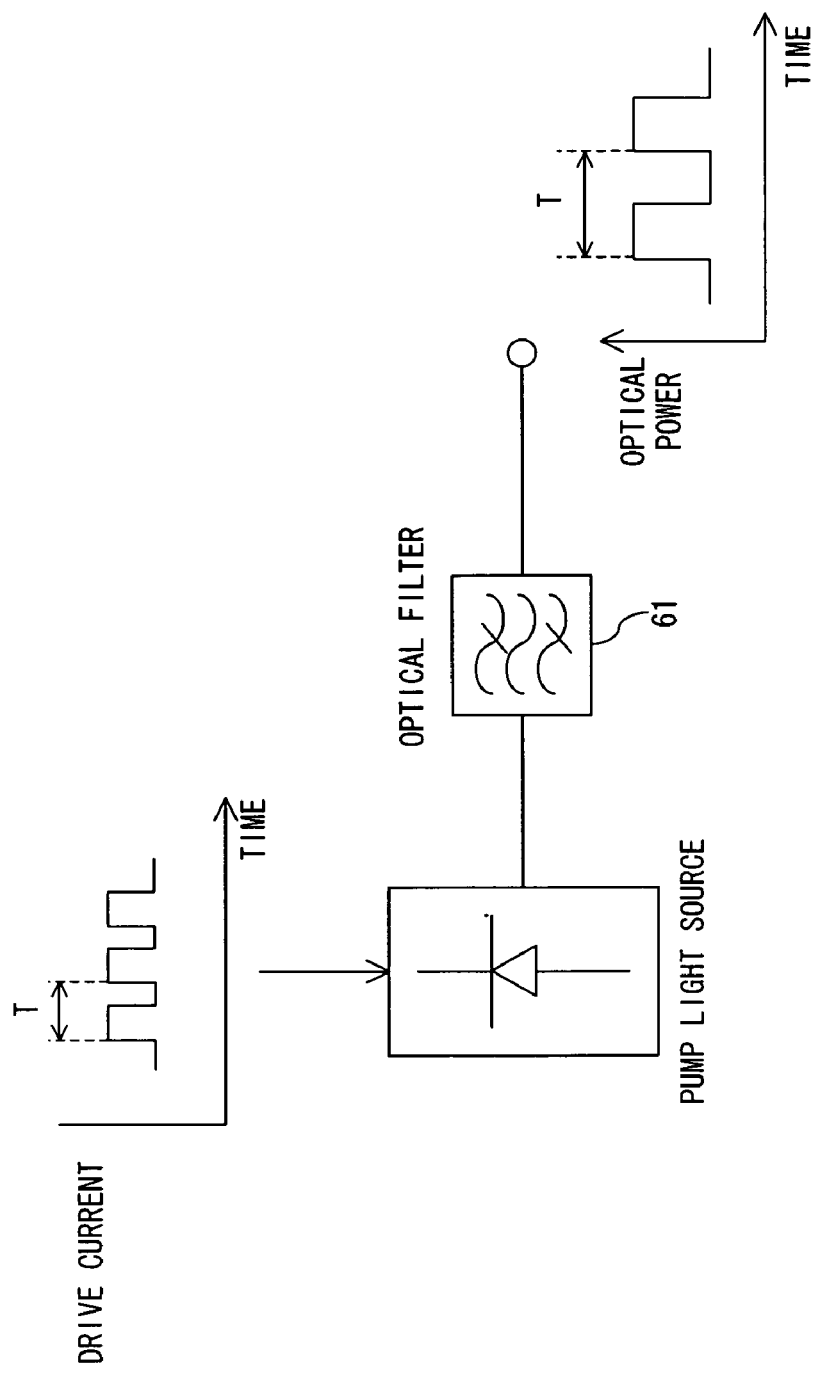
FIG. 21 shows an embodiment of a method of modulating pump light.

FIG. 21 shows an embodiment of the method of modulating pump light. In the embodiment, each pump light source is driven by a drive signal described above by referring to FIG. 20. That is, a drive current fluctuating in the modulation period T is supplied to a pump light source. Thus, the frequency of the pump light output from a pump light source fluctuates to a small extent in the modulation period T as shown in FIG. 22A. At this time, the power fluctuation of the pump light output from the pump light source is very low.

The pump light output from the pump light source is filtered by a filter 61. The filter 61 passes only a predetermined frequency as shown in FIG. 22B. Practically, the center transmission frequency of the filter 61 matches the frequency fa (or frequency fb) shown in FIG. 22A. The passband width of the filter 61 is smaller than the absolute value of the "frequency fa–frequency fb". That is, the filter 61 can substantially cut off the frequency fb (or frequency fa), thereby obtaining pump light intensity-modulated in the modulation period T.

Figure 23:
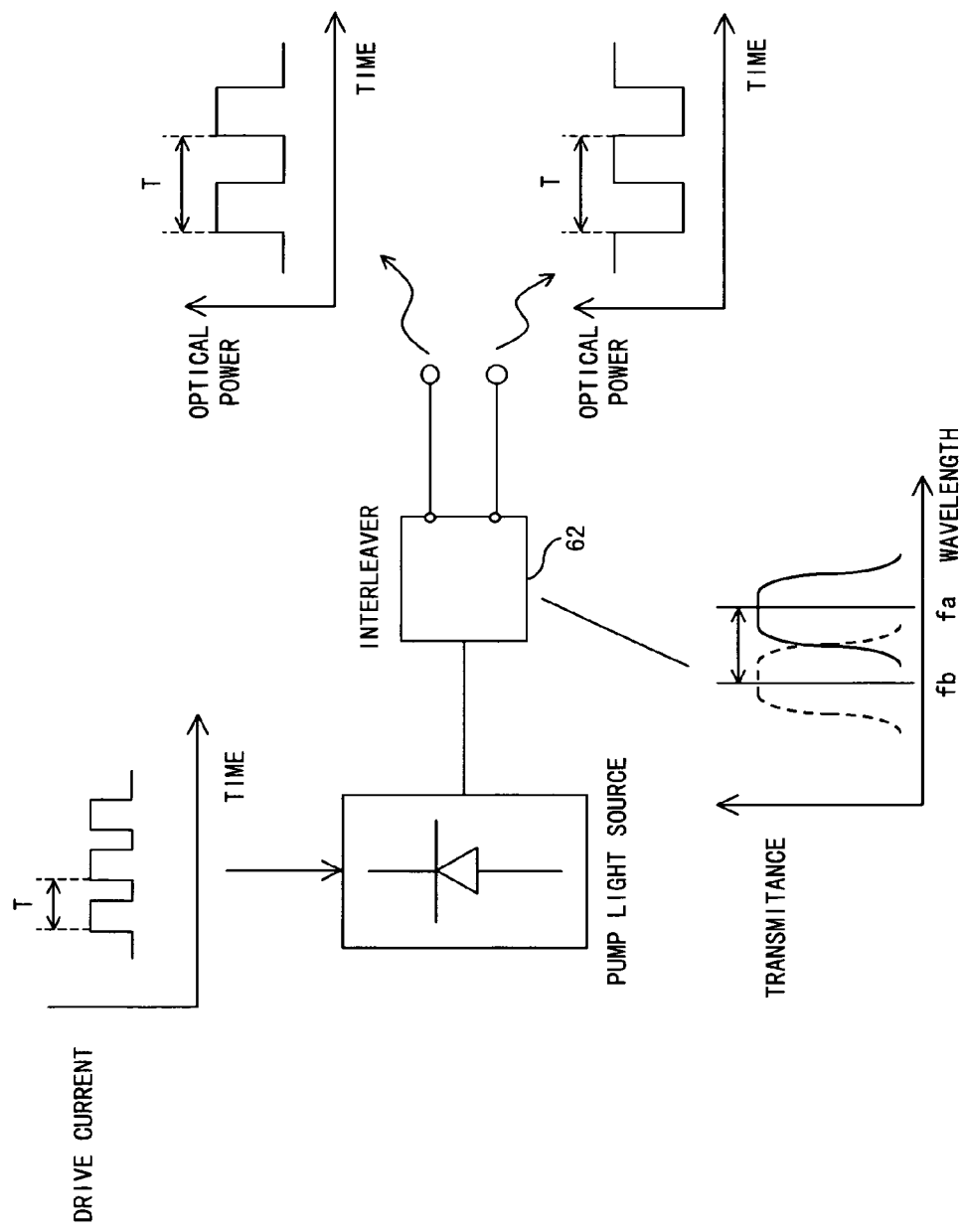
FIG. 23. shows another embodiment of a method of modulating pump light.

FIG. 23 shows another embodiment of the method of modulating pump light. In the embodiment, the pump light is driven in the same method as the embodiment shown in FIG. 21. Therefore, in this embodiment, the frequency of the pump light output from the pump light source is fluctuated in the modulation period T as shown in FIG. 22A.

The output of the pump light source is supplied to an interleaver 62. The interleaver 62 is an optical device having a plurality of passbands, and the plurality of passbands periodically appear in the frequency. The interleaver 62 outputs a signal with the frequency fa shown in FIG. 22A from one output terminal, and outputs a signal with the frequency fb from the other output terminal. Thus, a set of pump light intensity-modulated in the modulation period T is obtained. The set of modulated pump light has opposite phases. One and the other pump light of the set of modulated pump light generated in the embodiment can be supplied to an up line and a down line shown in FIG. 19, respectively.

FIG. 24 shows another embodiment of the method of modulating pump light. In this embodiment, the pump light source is practically driven by a constant drive current. Therefore, the frequency of the generated pump light is substantially constant.

The generated pump light is supplied to a polarized plane control element 63. The polarized plane control element 63 changes the polarizing angle of input light according to a modulation signal. The modulation signal is the same as the drive signal generated by a circuit shown in FIG. 20. The polarized plane control element 63 is provided with an electromagnet whose electromagnetic force is controlled by a supplied modulation signal. The polarized plane of light passing through the polarized plane control element 63 changes depending on the electromagnetic force generated by the electromagnet. Therefore, the polarized plane of the light passing through the polarized plane control element 63 changes with the modulation signal.

A polarized wave separator 64 separates the pump light output from the polarized plane control element 63 into element perpendicular to each other. The polarized plane of the pump light output from the polarized plane control element 63 changes with the modulation signal. Therefore, a set of pump light intensity-modulated in the modulation period T is obtained. As a result, one and the other pump light of the set of the modulated pump light generated according to the embodiment can be supplied to the up line and the down line shown in FIG. 19, respectively, as in the embodiment shown in FIG. 23.

Described below is the guideline of the modulation period when pump light is intensity-modulated. First, the modulation period is computed with the wavelength dispersion of the transmission medium (that is, the optical fiber as a Raman amplifier) taken into account. In this example, it is assumed that the wavelength dispersion of the optical fiber is −60 psec/nm/km, the wavelength difference between a set of pump light (in this example, the wavelength difference equal to the Raman shift frequency) is 100 nm, and the effective fiber length is 20 km. In this case, when the above-mentioned set of pump light is propagated through the above-mentioned optical fiber, one pump light is 120 nsec behind the other.

It is necessary that the delay time is sufficiently smaller than the pulse width of the modulation signal (that is, the time period in which the pump light is in the emission state) for the following reason. That is, in the Raman amplifier according to the present embodiment, the modulation is performed such that a set of pump light whose frequency difference equals the Raman shift frequency cannot simultaneously enter the emission state. However, if a delay occurs due to the wavelength dispersion, the set of pump light simultaneously enter the emission state for the time corresponding to the delay time, and a pump-to-pump phenomenon occurs in the period in which the set of pump light simultaneously enter the emission state.

Therefore, for example, when the duty of the modulation signal is 50 percents, and if the delay time due to the wavelength dispersion is 1/10 of the pulse width of the modulation signal, then the frequency of the modulation signal is 0.42 MHz. In the above-mentioned simulation, the effective fiber length is assumed to be 20 km in computing the frequency of the modulation signal. However, the area in which a large Raman amplifier can be obtained is in the range of about some kilometers from the pump light source. Therefore, with the range defined as a effective fiber length, the frequency of the modulation signal can be enhanced up to some MHz.

On the other hand, if the period of the modulation signal for modulation of pump light is extended, the period in which pump light is not supplied to a transmission medium (that is, an optical fiber as a Raman amplification medium) is also extended. Therefore, if the period of the modulation signal is too long, signal light passes the transmission medium in the period in which pump light is not supplied to the transmission medium. That is, in this case, the signal light cannot be appropriately amplified.

In the Raman amplifier according to the present embodiment, the lower limit of the frequency of the modulation signal for modulation of pump light is set. Practically, for example, if the effective fiber length is 20 km, and the propagation speed of the light in the optical fiber is $2 \times 10^8$ m/sec, then it is necessary to set the modulation frequency higher than 20 kHz to avoid the period in which pump light is not supplied to the optical fiber at all.

In addition, in the above embodiments, the plural variations of pump light are modulated such that the pump light having the frequency difference practically equal to the Raman shift frequency cannot simultaneously indicate the emission state. However, the present invention is not limited to this configuration. That is to say, the plural variations of pump light are modulated such that the pump light having the frequency difference within a range from zero through practically equal to the Raman shift frequency cannot simultaneously indicate the emission state.

According to the present invention, the transfer of energy between pump light can be reduced in the Raman amplifier having a gain bandwidth larger than the bandwidth corresponding to the Raman shift frequency using plural variations of pump light. As a result, control can be more easily performed to improve the noise characteristic and/or to obtain flat Raman amplification.

What is claimed is:

1. A Raman amplifier comprising:
   a transmission medium propagating a WDM signal;
   a pump light source generating a plurality of pump lights having different frequencies;
   a modulation unit modulating the pump lights into a plurality of coordinating pairs of pump lights, wherein each pair includes a first pump light and a second pump light, and for each pair,
      a frequency difference between the first pump light and the second pump light is equal to a Raman frequency shift,
      the first pump light within the pair alternates between a first optical level and a second optical level lower than the first optical level,
      the second pump light within the pair alternates between the second optical level and the first optical level, and
      the modulation unit modulates the first and second pump lights within the pair so that the first pump light and the second pump light within the pair are not simultaneously at the first optical level; and
   an optical guide device guiding the pump lights modulated by said modulation unit to said transmission medium so that the modulated pump lights thereby cause Raman amplification of the WDM signal propagating in the transmission medium.

2. The Raman amplifier according to claim 1, wherein said second optical level indicates an extinction state.

3. The Raman amplifier according to claim 1, wherein, for each coordinated pair of pump lights, a rate of time period at which the first or second pump light of the pair indicates the first optical level is equal to or less than 50 percent.

4. The Raman amplifier according to claim 1, wherein a bandwidth of the Raman amplification is twice as large as an amplification bandwidth corresponding to the Raman shift frequency.

5. The Raman amplifier according to claim 1, wherein the plurality of pump lights are arranged at frequency intervals of 1/n of the Raman shift frequency (n is a natural number).

6. The Raman amplifier according to claim 5, wherein said modulation unit intensity-modulates the pump lights in a period T and in the same modulation pattern, and sequentially delays variations of modulated pump light by $T/(2 \times n)$.

7. The Raman amplifier according to claim 1, wherein:
   said transmission medium comprises a first transmission medium and a second transmission medium; and
   said optical guide device comprises an optical switch for guiding the pump lights alternately to the first transmission medium and the second transmission medium.

8. The Raman amplifier according to claim 1, wherein:
   said pump light source comprises a plurality of optical elements for generating the plurality of pump lights by being respectively driven by drive signals of predetermined periods; and
   said modulation unit comprises a plurality of optical filters for passing corresponding predetermined frequency components from pump lights generated by said plurality of optical elements.

9. The Raman amplifier according to claim 1, wherein:
   said transmission medium comprises a first transmission medium and a second transmission medium;
   said pump light source comprises a plurality of optical elements for generating the plurality of pump lights by being respectively driven by drive signals of predetermined periods;
   said modulation unit comprises a plurality of interleavers provided for the plurality of optical elements; and
   said plurality of interleavers guide corresponding pump lights to the first and second transmission media.

10. The Raman amplifier according to claim 1, wherein:
    said transmission medium comprises a first transmission medium and a second transmission medium;
    said modulation unit further comprises:
    a plurality of polarized plane control elements changing polarized planes of the plurality of pump lights in respective periods; and a plurality of polarized wave separators separating output of the plurality of polarized plane control elements into polarized waves normal to each other; and each polarized wave separated by said plurality of polarized wave separators is guided to said first and second transmission media.

11. The Raman amplifier according to claim 1, wherein a modulation period of said modulation unit is sufficiently longer than a propagation time difference between a pair of pump lights whose frequency difference equals the Raman shift frequency in said transmission medium.

12. The Raman amplifier according to claim 11, wherein the modulation period is set at ten times or more as long as the propagation time difference.

13. The Raman amplifier according to claim 1, wherein a modulation period of said modulation unit is set such that a time period in which a pump light indicates the second optical level in the modulation period can be shorter than a propagation time required to propagate the pump light through the transmission medium.

14. A Raman amplifier comprising:
a transmission medium propagating a WDM signal;
a pump light source generating a plurality of pairs of pump lights, each pair including first and second pump lights with a frequency difference between the first and second pump lights being equal to a Raman frequency shift;
a modulation unit modulating the first and second pump lights of each pair into optical signals each of which alternates between a first optical level and a second optical level lower than the first optical level, and so that the first and second pump lights are not simultaneously at the first level; and
an optical guide device guiding the pump lights modulated by said modulation unit to said transmission medium so that the modulated pump lights thereby cause Raman amplification of the WDM signal propagating in the transmission medium.

15. The Raman amplifier according to claim 1, wherein the first optical level corresponds to an emission state, and the second optical level corresponds to extinct state or an emission state at a level lower than the first optical level.

16. The Raman amplifier according to claim 14, wherein the first optical level corresponds to an emission state, and the second optical level corresponds to extinct state or an emission state at a level lower than the first optical level.

17. The Raman amplifier according to claim 1, wherein the pump lights are arranged so that the Raman amplification has a bandwidth larger than an amplification bandwidth corresponding to the Raman frequency shift.

18. The Raman amplifier according to claim 14, wherein the pump lights are arranged so that the Raman amplification has a bandwidth larger than an amplification bandwidth corresponding to the Raman frequency shift.

19. A Raman amplifier comprising:
a transmission medium though which a WDM signal propagates and is provided with a plurality of Raman pump lights to thereby cause the WDM signal to be Raman amplified with a Raman amplification bandwidth as the WDM signal propagates through the transmission medium, wherein
the plurality of pump lights include a plurality of pairs of pump lights, each pair including first and second pump lights with a frequency difference between the first and second pump lights being equal to a Raman frequency shift, and
the first and second pump lights of each pair being modulated so that, for each pair,
the modulated first and second pump lights of the respective pair each alternate between a first optical level corresponding to an emission state and a second optical level corresponding to an extinct state or an emission state lower than the first optical level, and
the first and second pump lights of the respective pair are not simultaneously at the first optical level.

20. The Raman amplifier according to claim 19, wherein the plurality of pump lights are arranged so that the Raman amplification bandwidth is larger than an amplification bandwidth corresponding to the Raman frequency shift.

21. A Raman amplifier comprising:
a transmission medium though which a WDM signal propagates;
at least one pump light source providing a plurality of Raman pump lights, the plurality of Raman pump lights include a plurality of pairs of pump lights, each pair including first and second pump lights with a frequency difference between the first and second pump lights being equal to a Raman frequency shift;
a modulator modulating the first and second pump lights of each pair so that, for each pair,
the modulated first and second pump lights of the respective pair each alternate between a first optical level corresponding to an emission state and a second optical level corresponding to an extinct state or an emission state lower than the first optical level, and
the first and second pump lights of the respective pair are not simultaneously at the first optical level; and
a coupler providing the modulated first and second pump lights of each pair to the transmission medium to thereby cause the WDM signal to be Raman amplified with a Raman amplification bandwidth as the WDM signal propagates through the transmission medium.

22. The Raman amplifier according to claim 21, wherein the plurality of Raman pump lights are arranged so that the Raman amplification bandwidth is larger than an amplification bandwidth corresponding to the Raman frequency shift.

23. A Raman amplifier comprising:
a transmission medium though which a WDM signal propagates;
means for providing a plurality of Raman pump lights, the plurality of Raman pump lights include a plurality of pairs of pump lights, each pair including first and second pump lights with a frequency difference between the first and second pump lights being equal to a Raman frequency shift;
means for modulating the first and second pump lights of each pair so that, for each pair, the modulated first and second pump lights of the respective pair each alternate between a first optical level corresponding to an emission state and a second optical level corresponding to an extinct state or an emission state lower than the first optical level, and the first and second pump lights of the respective pair are not simultaneously at the first optical level; and
means for providing the modulated first and second pump lights of each pair to the transmission medium to thereby cause the WDM signal to be Raman amplified with a Raman amplification bandwidth as the WDM signal propagates through the transmission medium.

24. The Raman amplifier according to claim 23, wherein the plurality of Raman pump lights are arranged so that the Raman amplification bandwidth is larger than an amplification bandwidth corresponding to the Raman frequency shift.

* * * * *

UNITED STATES PATENT AND TRADEMARK OFFICE
CERTIFICATE OF CORRECTION

| | | |
|---|---|---|
| PATENT NO. | : 7,379,233 B2 | Page 1 of 1 |
| APPLICATION NO. | : 10/715141 | |
| DATED | : May 27, 2008 | |
| INVENTOR(S) | : Hiroshi Nakamoto et al. | |

It is certified that error appears in the above-identified patent and that said Letters Patent is hereby corrected as shown below:

On the Title page item (57), Column 2 (Abstract), Line 7, change "enters" to --enter--.

On the Title page item (57), Column 2 (Abstract), Line 9, change "curcuit." change "A" to --An--.

Column 19, Line 57, change "though" to --through--.

Column 20, Line 14, change "though" to --through--.

Column 20, Line 42, change "though" to --through--.

Signed and Sealed this

Sixteenth Day of September, 2008

JON W. DUDAS
*Director of the United States Patent and Trademark Office*